US011057690B2

(12) United States Patent
Al Sayeed et al.

(10) Patent No.: US 11,057,690 B2
(45) Date of Patent: Jul. 6, 2021

(54) SPECTRUM ASSIGNMENTS FOR APPLICATION THROUGHOUT AN OPTICAL NETWORK ELEMENT IN A FLEXIBLE-CHANNEL CONFIGURATION

(71) Applicant: Ciena Corporation, Hanover, MD (US)

(72) Inventors: Choudhury A. Al Sayeed, Stittsville (CA); Khaled Maamoun, Nepean (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/684,096

(22) Filed: Nov. 14, 2019

(65) Prior Publication Data

US 2021/0152900 A1    May 20, 2021

(51) Int. Cl.
*H04B 10/00* (2013.01)
*H04Q 11/00* (2006.01)
*H04J 14/02* (2006.01)
*H04J 14/00* (2006.01)

(52) U.S. Cl.
CPC ...... *H04Q 11/0066* (2013.01); *H04J 14/0212* (2013.01); *H04J 14/0267* (2013.01); *H04Q 11/0005* (2013.01); *H04Q 2011/0016* (2013.01); *H04Q 2011/0073* (2013.01); *H04Q 2011/0086* (2013.01)

(58) Field of Classification Search
CPC .......................... H04J 14/021; H04J 14/0212
See application file for complete search history.

(56) References Cited

U.S. PATENT DOCUMENTS

| | | |
|---|---|---|
| 9,276,696 B2 | 3/2016 | Al Sayeed et al. |
| 9,344,191 B2 | 5/2016 | Al Sayeed et al. |
| 9,485,013 B2 | 11/2016 | Al Sayeed et al. |
| 9,577,763 B2 | 2/2017 | Al Sayeed et al. |
| 9,686,599 B2 | 6/2017 | Maamoun |
| 9,768,902 B2 | 9/2017 | Al Sayeed et al. |
| 9,806,803 B2 | 10/2017 | Bownass et al. |
| 9,882,634 B1 | 1/2018 | Al Sayeed et al. |
| 9,906,294 B2 | 2/2018 | Al Sayeed et al. |
| 9,918,148 B2 | 3/2018 | Swinkels et al. |
| 9,985,726 B1 | 5/2018 | Al Sayeed et al. |
| 9,986,317 B1 | 5/2018 | Al Sayeed et al. |
| 10,063,313 B1 | 8/2018 | Al Sayeed et al. |

(Continued)

*Primary Examiner* — Daniel G Dobson
(74) *Attorney, Agent, or Firm* — Clements Bernard Walker; Lawrence A. Baratta, Jr.; Christopher L. Bernard

(57) ABSTRACT

Systems and methods for creating a spectrum assignment for use by an optical network element are provided. In one implementation, an optical network element may include line devices configured to communicate optical signals with external network elements along one or more degrees. The optical network element may also include add/drop devices configured to perform at least one of adding one or more optical channels to the optical signals and removing one or more optical channels to the optical signals. The line devices and add/drop devices are configured to receive control signals from a spectrum management controller, the control signals being configured to allocate a first spectrum assignment for routing the optical signals through the line devices and further configured to allocate a second spectrum assignment for routing the optical signals through the add/drop devices. For example, the second spectrum assignment may be different from the first spectrum assignment.

20 Claims, 13 Drawing Sheets

(56) References Cited

U.S. PATENT DOCUMENTS

| | | |
|---|---|---|
| 10,237,011 B2 | 3/2019 | Al Sayeed et al. |
| 10,298,356 B1 | 5/2019 | Châtelain et al. |
| 10,361,957 B1 | 7/2019 | Mackay et al. |
| 10,404,401 B1 | 9/2019 | Maamoun et al. |
| 10,439,709 B1 | 10/2019 | Al Sayeed |
| 2019/0081701 A1* | 3/2019 | Oda ................... H04B 10/0775 |
| 2019/0103939 A1 | 4/2019 | Al Sayeed et al. |
| 2019/0173602 A1 | 6/2019 | Al Sayeed et al. |

* cited by examiner

*210*

| Spectrum Requirement for Non-constrained Add/Drop Structure ||||||
|---|---|---|---|---|---|
| NMC Count | Deadband (line) | NMC Bandwidth | Guardband (line) | Required BW MC (line) | Round-up BW MC (line) |
| 1 | 8 | 59 | 2.5 | 75 | 75 |
| 2 | 8 | 59 | 2.5 | 136.5 | 137.5 |
| 3 | 8 | 59 | 2.5 | 198 | 200 |
| 4 | 8 | 59 | 2.5 | 259.5 | 262.5 |
| 5 | 8 | 59 | 2.5 | 321 | 325 |
| 6 | 8 | 59 | 2.5 | 382.5 | 387.5 |
| 7 | 8 | 59 | 2.5 | 444 | 450 |
| 8 | 8 | 59 | 2.5 | 505.5 | 506.25 |
| 9 | 8 | 59 | 2.5 | 567 | 568.75 |
| 10 | 8 | 59 | 2.5 | 628.5 | 631.25 |
| 11 | 8 | 59 | 2.5 | 690 | 693.75 |
| 12 | 8 | 59 | 2.5 | 751.5 | 756.25 |
| 13 | 8 | 59 | 2.5 | 813 | 818.75 |
| 14 | 8 | 59 | 2.5 | 874.5 | 875 |
| 15 | 8 | 59 | 2.5 | 936 | 937.5 |
| 16 | 8 | 59 | 2.5 | 997.5 | 1000 |

| Spectrum Assignment for WSS-based Add/Drop Structure w/DB & Resolution Constraint | | | | | | | |
|---|---|---|---|---|---|---|---|
| NMC Count | Deadband (line) | NMC Bandwidth | Guardband (line) | FS | ΣFS | Required BW MC (line) | Round-up BW MC (line) |
| 1 | 9.375 | 59.375 | 3.125 | 0 | 0 | 78.125 | 81.25 |
| 2 | 9.375 | 59.375 | 3.125 | 0 | 0 | 140.625 | 143.75 |
| 3 | 9.375 | 59.375 | 3.125 | 0 | 0 | 203.125 | 206.25 |
| 4 | 9.375 | 59.375 | 3.125 | 0 | 0 | 265.625 | 268.75 |
| 5 | 9.375 | 59.375 | 3.125 | 0 | 0 | 328.125 | 331.25 |
| 6 | 9.375 | 59.375 | 3.125 | 0 | 0 | 390.625 | 393.75 |
| 7 | 9.375 | 59.375 | 3.125 | 0 | 0 | 453.125 | 456.25 |
| 8 | 9.375 | 59.375 | 3.125 | 0 | 0 | 515.625 | 518.75 |
| 9 | 9.375 | 59.375 | 3.125 | 0 | 0 | 578.125 | 581.25 |
| 10 | 9.375 | 59.375 | 3.125 | 0 | 0 | 640.625 | 643.75 |
| 11 | 9.375 | 59.375 | 3.125 | 0 | 0 | 703.125 | 706.25 |
| 12 | 9.375 | 59.375 | 3.125 | 0 | 0 | 765.625 | 768.75 |
| 13 | 9.375 | 59.375 | 3.125 | 0 | 0 | 828.125 | 831.25 |
| 14 | 9.375 | 59.375 | 3.125 | 0 | 0 | 890.625 | 893.75 |
| 15 | 9.375 | 59.375 | 3.125 | 0 | 0 | 953.125 | 956.25 |
| 16 | 9.375 | 59.375 | 3.125 | 0 | 0 | 1015.625 | 1018.75 |

| Spectrum Requirement for Non-constrained Add/Drop Structure ||||||
| NMC Count | Deadband (line) | NMC Bandwidth | Guardband (line) | Required BW MC (line) | Round-up BW MC (line) |
| --- | --- | --- | --- | --- | --- |
| 1 | 8 | 59 | 2.5 | 75 | 75 |
| 2 | 8 | 59 | 2.5 | 136.5 | 137.5 |
| 3 | 8 | 59 | 2.5 | 198 | 200 |
| 4 | 8 | 59 | 2.5 | 259.5 | 262.5 |
| 5 | 8 | 59 | 2.5 | 321 | 325 |
| 6 | 8 | 59 | 2.5 | 382.5 | 387.5 |
| 7 | 8 | 59 | 2.5 | 444 | 450 |
| 8 | 8 | 59 | 2.5 | 505.5 | 506.25 |
| 9 | 8 | 59 | 2.5 | 567 | 568.75 |
| 10 | 8 | 59 | 2.5 | 628.5 | 631.25 |
| 11 | 8 | 59 | 2.5 | 690 | 693.75 |
| 12 | 8 | 59 | 2.5 | 751.5 | 756.25 |
| 13 | 8 | 59 | 2.5 | 813 | 818.75 |
| 14 | 8 | 59 | 2.5 | 874.5 | 875 |
| 15 | 8 | 59 | 2.5 | 936 | 937.5 |
| 16 | 8 | 59 | 2.5 | 997.5 | 1000 |

| Spectrum Assignment for WSS-based Add/Drop Structure w/DB & Resolution Constraint | | | | | | | |
|---|---|---|---|---|---|---|---|
| NMC Count | Deadband (line) | NMC Bandwidth | Guardband (line) | FS | ΣFS | Required BW MC (line) | Round-up BW MC (line) |
| 1 | 8 | 59 | 2.5 | 0 | 0 | 75 | 75 |
| 2 | 8 | 59 | 2.5 | 0 | 0 | 136.5 | 137.5 |
| 3 | 8 | 59 | 2.5 | 0.25 | 0.25 | 198.25 | 200 |
| 4 | 8 | 59 | 2.5 | 0 | 0.25 | 259.75 | 262.5 |
| 5 | 8 | 59 | 2.5 | 0 | 0.25 | 321.25 | 325 |
| 6 | 8 | 59 | 2.5 | 0 | 0.25 | 382.75 | 387.5 |
| 7 | 8 | 59 | 2.5 | 0 | 0.25 | 444.25 | 450 |
| 8 | 8 | 59 | 2.5 | 0 | 0.25 | 505.75 | 506.25 |
| 9 | 8 | 59 | 2.5 | 0 | 0.25 | 567.25 | 568.75 |
| 10 | 8 | 59 | 2.5 | 0 | 0.25 | 628.75 | 631.25 |
| 11 | 8 | 59 | 2.5 | 0 | 0.25 | 690.25 | 693.75 |
| 12 | 8 | 59 | 2.5 | 0 | 0.25 | 751.75 | 756.25 |
| 13 | 8 | 59 | 2.5 | 0 | 0.25 | 813.25 | 818.75 |
| 14 | 8 | 59 | 2.5 | 0 | 0.25 | 874.75 | 875 |
| 15 | 8 | 59 | 2.5 | 0 | 0.25 | 936.25 | 937.5 |
| 16 | 8 | 59 | 2.5 | 0.5 | 0.75 | 998.25 | 1000 |

SPECTRUM ASSIGNMENTS FOR APPLICATION THROUGHOUT AN OPTICAL NETWORK ELEMENT IN A FLEXIBLE-CHANNEL CONFIGURATION

TECHNICAL FIELD

The present disclosure generally relates to optical networking systems and methods. More particularly, the present disclosure relates to optical network elements configured for operation within a flexible spectrum network and for creating spectrum assignments for application throughout the optical network elements in the flexible spectrum network.

BACKGROUND

Generally, transmitting communication signals through fiber optic cables is preferred since this medium is able to provide a higher bandwidth than electrical cable. Also, optical signals can be transmitted over longer distances with less signal attenuation than electrical signals. Another benefit of fiber optic cables over electrical cables is that optical signals are essentially immune to electromagnetic interference.

FIG. 1 shows an optical communication link 10 that may be used in a telecommunications network for enabling communication between two neighboring nodes (i.e., a west node 12 and an east node 14). In this example, the optical communication link 10 is bi-directional to allow communication signals to be transmitted from the west node 12 to the east node 14, and vice versa. The west node 12 includes an output from a Wavelength Selective Switching (WSS) multiplexer 16 which is provided through a post-amplifier 18. The east node 14 receives signals from the west node 12 via a pre-amplifier 20 and a WSS demultiplexer 22.

In the opposite direction, the east node 14 includes a WSS multiplexer 24 and a post-amplifier 26 for transmitting signals to the west node 12. The west node 12 receives the signals from the east node 14 via a pre-amplifier 28 and a WSS demultiplexer 30. Some of the optical signals can be passed through the west node 12 to another node, while other optical signals may be dropped (i.e., removed) at the WSS demultiplexer 30 and passed to a channel multiplexer/demultiplexer (CMD) 32. The CMD 32 is configured to demultiplex a number (x) of signals (channels) to a corresponding number (x) of transponders 34-1 through 34-x. Receiving portions of the transponders 34 are configured to receive these signals. Also, the transponders 34 include transmitting portions that are configured to transmit signals to the CMD 32 for routing to one or more neighboring nodes (e.g., the east node 14).

Similarly, on the east node 14, the WSS multiplexer 22 receives optical signals from the west node 12 and can pass some of these signals to another node and/or drop (remove) other signals. The dropped signals are supplied to a CMD 36, which demultiplexes signals to receiving components of a plurality of transponders 38-1 through 38-x. The transponders 38 also provide signals from corresponding transmitting components to the CMD 36 for routing to one or more neighboring nodes (e.g., the west node 12).

The CMDs 32, 36 may be contentionless, colorless-channel mux/demux devices. The CMDs 32, 36 can be multicast switch-based devices and/or WSS-based devices. Also, the CMDs 32, 36 may be configured as multi-cast broadband switches or combiner-based colorless-channel multiplexer/demultiplexer devices where each port of the device can colorlessly (i.e., any wavelength or spectrum) add or drop channels. However, the CMDs 32, 36 do not include spectrum selective devices for characterizing the provisioning of optical channels in a spectrum assignment.

In channel management, a Media Channel (MC) represents the contiguous filter width in a medium such as in a spectrum selective switching component for a single Network Media Channel (NMC), or for a super-channel or for a plurality of NMCs that are sharing the same optical switch ports along the route. MCs are created per optical component, or more precisely per spectrum selective switching element. MC bandwidth for a given set of channels can be different over different spectrum switching elements based on each element's resolution and deadband requirements, where deadband refers to the bandwidth allocated on each edge of an MC to avoid filter roll-off penalties on the NMCs. Deadbands are part of the MC bandwidth.

In contrast, a Network Media Channel (NMC) represents an end-to-end channel object that maintains the same center frequency and the bandwidth along every component along the route and the add/drop structure. The NMC can be a single channel or a super-channel formed with a plurality of sub-carriers sharing the same optical payload. NMCs are defined in terms of center frequencies and symmetrical bandwidth. Channel Spacing is defined as the frequency spacing between center frequencies of two neighboring NMCs, where guardband is referred to as the spectral gap between two adjacent NMC edges sharing the same MC. Guardbands are not part of the NMC bandwidth but contribute to the total MC bandwidth.

FIG. 2 is a spectrum assignment 40 showing a number of channels within a spectrum when the conventional fixed-grid add/drop devices is configured with flex-capable switching elements facing the line-fibers 10 of FIG. 1 in a "fixed" channel arrangement. In a fixed channel network, each of a number of wavebands 42 includes the same (or fixed) bandwidth. As known in the art, a waveband is a range of electromagnetic wavelengths or frequencies. The spectrum assignment 40 is configured in this example such that the entire media channel (MC) includes a spectrum that comprises five equal wavebands 42, two end deadbands 44 to avoid filter roll-off penalties on the edge optical signals, and four guardbands 46 used for separating the five wavebands 42 to comply with the fixed grid constraints imposed by the fixed add/drop devices. The center of each waveband 42 includes a center frequency $f_c$ that is equally separated from the deadbands or guardbands defining the respective waveband 42.

Channel spacing can be defined as the spacing between center frequencies $f_c$. In a fixed channel network, the channel spacing is the same between each pair of neighboring wavebands. For example, the channel spacing between the first and second wavebands 42 is equal to the difference between fa and which will be equal to the difference between $f_{c3}$ and $f_{c2}$, the difference between $f_{c4}$ and $f_{c3}$, and so on. Alternatively, the channel spacing can be calculated by adding the bandwidth of the guardband 46 to the bandwidth of one of the wavebands 42.

With the spectrum assignment 40 of FIG. 2, the fixed grid elements (i.e., demultiplexers 22, 30, multiplexers 16, 24, and/or other colored channel mux/demux or fixed grid WSS devices) reside on the channel path. When there is a fixed grid element in the routing path, the grid mandates the spectrum assignment. In other words, an algorithm associated with the spectrum assignment follows the pre-defined grid or channel spacing. In the case of a plurality of fixed grids of different sizes, the algorithm will typically pick the deadbands and guardbands based on a lowest common multiple among the grids.

FIG. 3 is a spectrum assignment 50 when conventional optical switches (e.g., west node 12 and east node 14) operate internally and over the optical link 10 of FIG. 1 in a "flexible" channel arrangement with flex capable line devices and add/drop devices. A number of channels are shown within the spectrum of the MC. In the flexible channel network, wavebands 52 may include any bandwidth and may be different from each other. The spectrum assignment 50 is configured in this example such that the entire MC includes a spectrum that comprises five various wavebands 52a, 52b, 52c, 52d, 52e two deadbands 54 at the ends of the MC, and four guardbands 56 used for separating the five wavebands 52. The center of each waveband 52 includes a center frequency that is spaced at various positions along the MC depending on the bandwidth of each of the wavebands 52.

FIG. 4 shows another conventional spectrum assignment 58 in a system where conventional optical switches (e.g., west node 12, east node 14, etc.) communicate over an optical link 10 and are configured in a flexible channel network arrangement. In this example, the spectrum assignment 58 is shown for two Network Media Channels (NMCs) of the MC. The first NMC (i.e., NMC1) and the second NMC (i.e., NMC2) each include a bandwidth of 59 GHz. A first deadband is 8 GHz, and a second deadband is 9 GHz. The guardband between NMC1 and NMC2 is 2.5 GHz. The spectrum assignment 58 in this example is configured for communication along the optical link 10 between the west node 12 and east node 14 shown in FIG. 1.

The NMC1 and NMC2 each include a 56 G Baud rate, and each occupy 59 GHz of the spectral width (i.e., the NMC width) of the MC. The deadband allocated on each edge of the MC is at least 8 GHz to avoid filter roll-off penalties. The two NMCs (i.e., NMC1 and NMC2) are placed with a 61.5 GHz channel spacing with the 2.5 GHz guardband in between the NMCs. The overall bandwidth for the MC is 137.5 GHz in this example for allocating two 56 G Baud signals.

The spectrum assignment 58 is created over a flexible network for use in the conventional arrangement shown in FIG. 1. In particular, the transponders 34, 38 of the nodes 12, 14 utilize the same resolution bandwidth and deadband requirements with no resolution restriction that are used with the WSS demultiplexers 22, 30, and WSS multiplexers 16, 24. In this spectrum assignment 58, multiple NMCs can reside on the same MC. Also, the spectrum assignment 58 is only focused on the line devices (i.e., 16, 22, 24, 30) with unified resolution and deadband constraints. Since there are no spectrum switching elements (e.g., WSSs) in the add/drop multiplexing/demultiplexing devices 32, 34, 36, 38, there is no need for bandwidth-constrained MC provisioning. Hence, no constraints are applied for NMC spectrum assignment.

Although the conventional network arrangements include workable spectrum assignment algorithms, there is a need in the field of optical communication systems to provide an efficient spectrum assignment in a flexible network using WSS-based contentionless and colorless add/drop devices of an optical switch.

SUMMARY

The present disclosure describes various embodiments of systems and methods for allocating bandwidth for end-to-end routing in an optical network element. The routing of optical signals includes a flexible grid arrangement whereby a first bandwidth assignment can be allocated for line devices of the optical network element, and a second bandwidth assignment can be allocated for add/drop devices of the optical network element. In one embodiment, an optical network element may include line devices configured to communicate optical signals with external network elements along one or more degrees. The optical network element may also include add/drop devices configured to perform at least one of adding one or more optical channels to the optical signals and removing one or more optical channels to the optical signals. The line devices and add/drop devices are configured to receive control signals from a spectrum management controller, where the control signals from the spectrum management controller are configured to allocate a first spectrum assignment for routing the optical signals through the line devices and further configured to allocate a second spectrum assignment for routing the optical signals through the add/drop devices. For instance, the second spectrum assignment may be different from the first spectrum assignment.

In another embodiment of the present disclosure, an optical communication protocol for routing an optical signal through an optical network element is provided. The optical communication protocol may include allocating a first spectrum assignment for routing the one or more optical signals through line devices of the optical network element having at least two degrees. The optical communication protocol may further include allocating a second spectrum assignment for routing the one or more optical signals through add/drop devices of the optical network element, where the second spectrum assignment may be different from the first spectrum assignment.

In yet another embodiment, a non-transitory computer-readable medium is provided. The non-transitory computer-readable medium is configured to store computer logic having instructions for causing one or more processing devices to perform various functions. For example, the computer logic causes the one or more processing devices to allocate a first spectrum assignment to control the routing of one or more optical signals through line devices of an optical network element and allocate a second spectrum assignment to control the routing of the one or more optical signals through add/drop devices of the optical network element, the second spectrum assignment being different from the first spectrum assignment.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIGS. 18-21 are tables illustrating information regarding the various spectrum assignment protocols for use with the optical network element of FIG. 7 for application in a flexible channel network, according to various embodiments.

DETAILED DESCRIPTION

Figure 1:
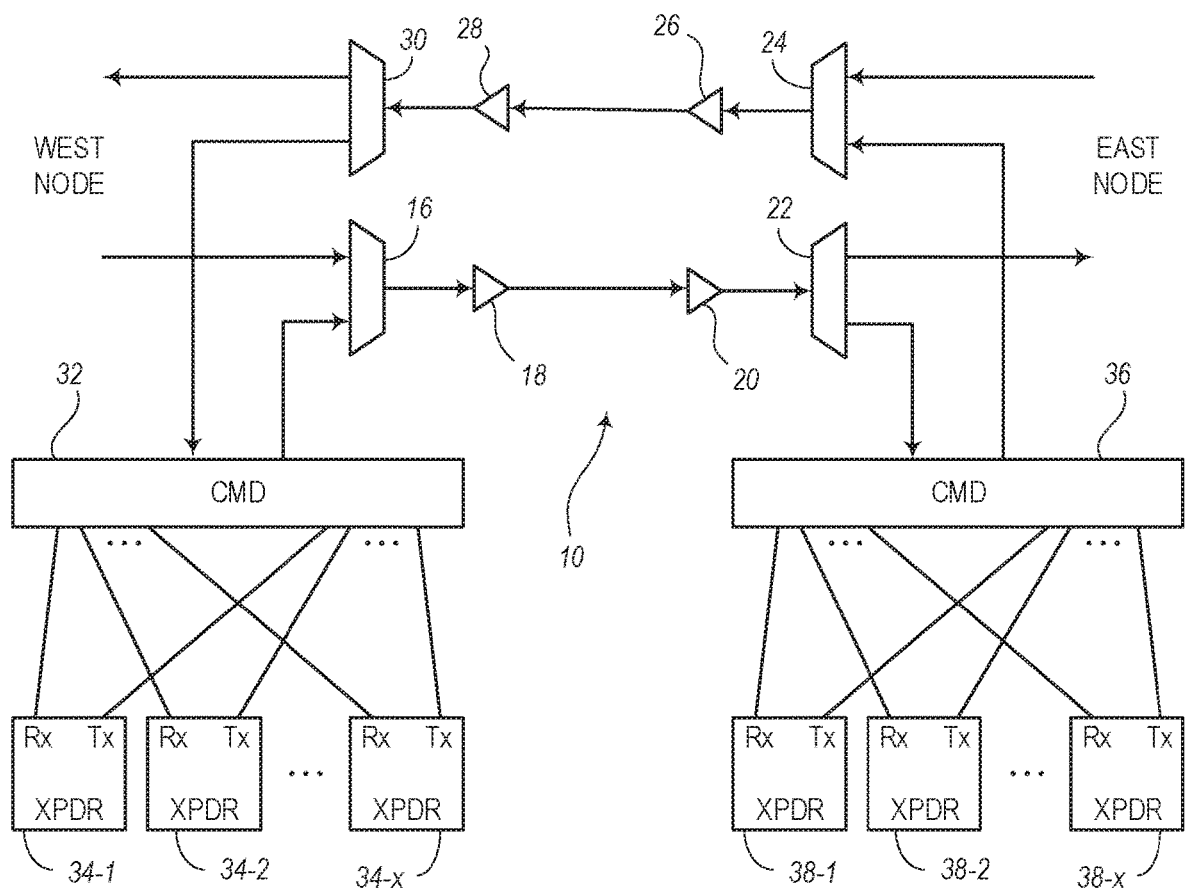
FIG. 1 is a block diagram illustrating an optical communication link in a telecommunications network for enabling communication between two neighboring nodes.
Figure 2:
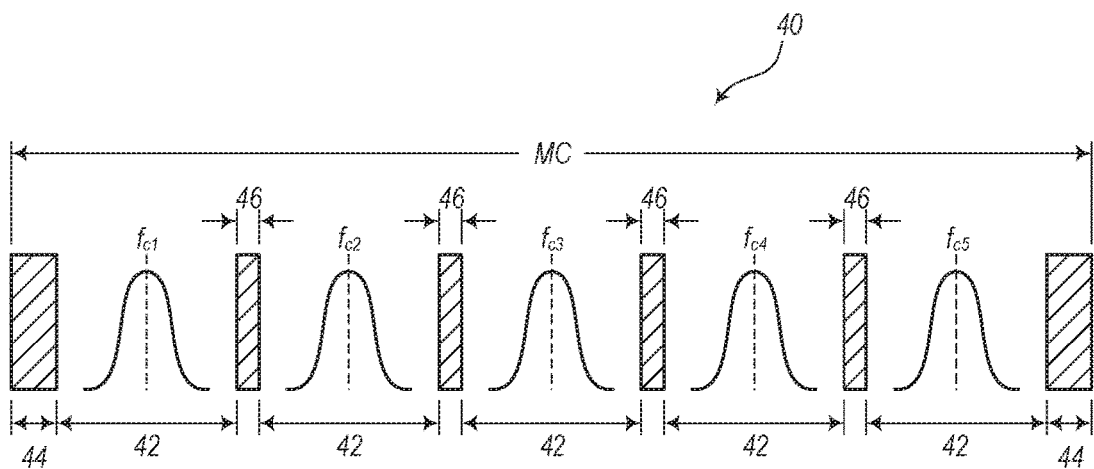
FIG. 2 is a diagram illustrating a conventional spectrum assignment for a fixed channel network.
Figure 3:
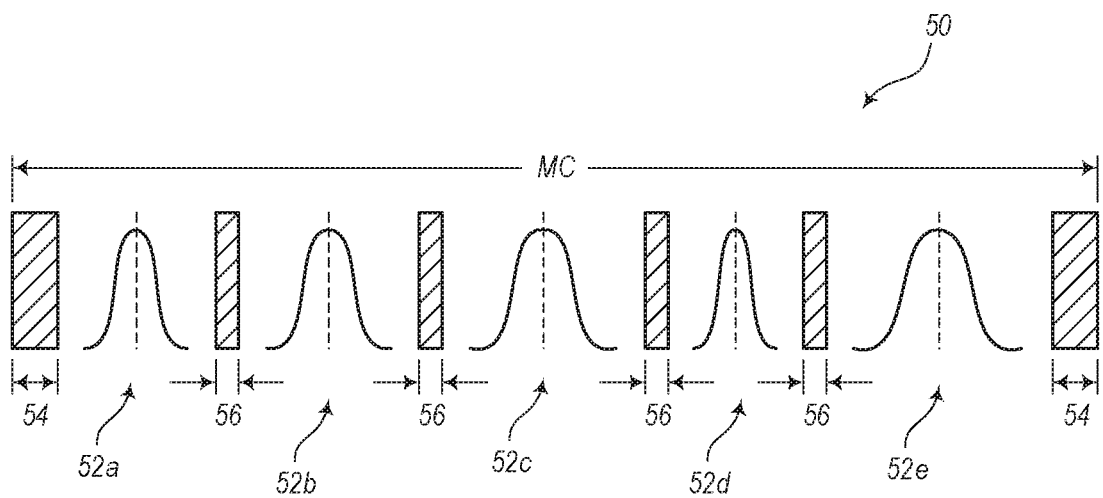
FIG. 3 is a diagram illustrating a conventional spectrum assignment for a flexible channel network.
Figure 4:
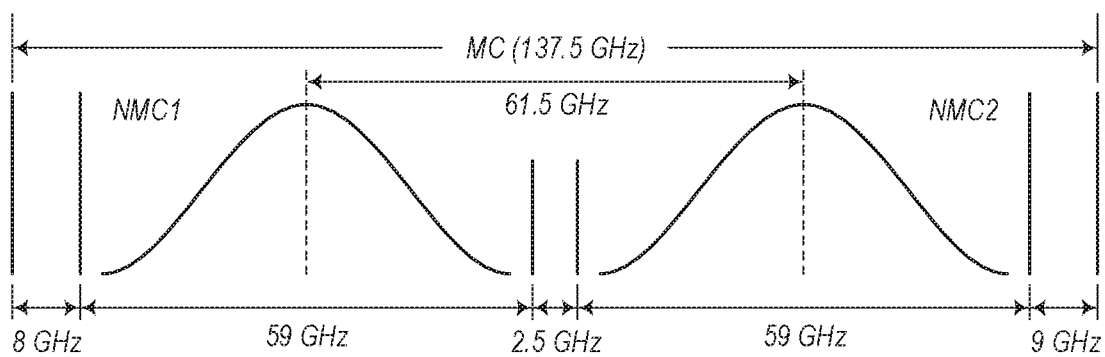
FIG. 4 is a diagram illustrating a conventional spectrum assignment for another flexible channel network.

The present disclosure relates to systems and methods for creating spectrum assignments for optical network elements, such as optical switches, for use in a flexible channel network arrangement. For example, the entire spectrum of interest in an optical network element may be defined as a Media Channel (MC). Normally, an MC includes one or more Network Media Channels (NMCs) that are arranged within the MC. In the present disclosure, the NMCs can be arranged according to various spectrum assignments as described herein. Also, the spectrum assignments of the present disclosure may include flexibility throughout an entire optical network element, as opposed to conventional network elements operating in a flexible-channel arrangement where the spectrum assignment is dictated by only the line (degree) devices of the optical network element.

According to various embodiments of the present disclosure, the size of the MC within an optical network element can be different over the "line" (or degree) devices versus the "add/drop" devices. This may be a result of different spectrum switching resolution and deadband requirements on both the line devices and add/drop devices.

Also, an optical network element may be configured, as described herein, such that it is not confined to a single MC. The number of MCs required for co-routing a plurality of NMCs can be different. That is, while in the line devices, all the co-routing NMCs can be accommodated into the same MC. However, while in the add/drop devices (e.g., contentionless, colorless multiplexer/demultiplexer device or other suitable elements), each NMC is added on its own individual add port (i.e., WSS switch ports) such that each NMC can reside on its own MC through the add/drop devices of the optical network element.

This means that for a line WSS, a plurality of NMCs can be accommodated in a single MC with effectively no restriction for frequency assignment for the NMCs, while for the add/drop devices without any pre-combiner, each NMC can be accommodated in its own MC. Each MC can be adjusted to the pixel resolution supported on that add/drop device (e.g., colorless channel mux/demux), which can be different than the line device (e.g., line WSS).

In some embodiments, a pre-combiner may be added within the optical network element, which can allow a plurality of NMCs to be squeezed into a single MC on the add/drop devices while maintaining its resolution and deadband requirements. A plurality of MCs from the add/drop devices, each of which may or may not contain a plurality of NMCs, can be combined to a single MC in the line devices (e.g., line WSS) to maintain the line device resolution and deadband requirements.

In general, the embodiments of the present disclosure include systems and methods for achieving an efficient spectrum assignment for NMCs in an all-flexible network, where the spectrum-selective switching characteristics of the add/drop devices operate within a different resolution and/or are restricted to different deadband constraints than those of the line-facing spectrum switching elements.

There has thus been outlined, rather broadly, the features of the present disclosure in order that the detailed description may be better understood and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments, which are illustrated in the accompanying drawings.

Creating Spectrum Assignments

Figure 5:
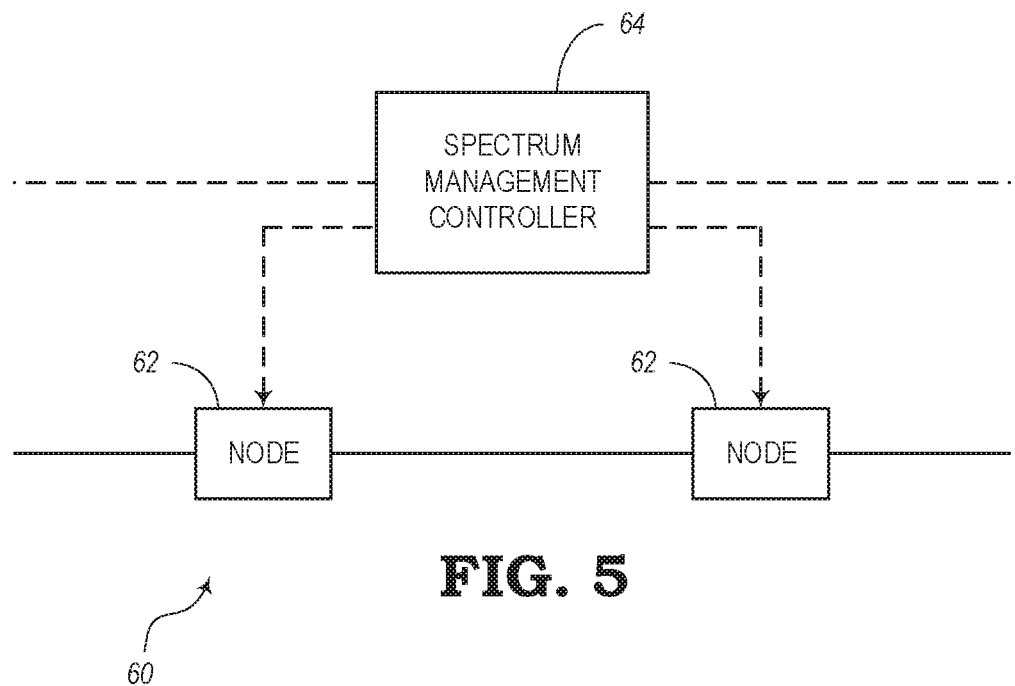
FIG. 5 is a block diagram illustrating a control system for controlling the spectrum assignment of various optical devices, according to various embodiments of the present disclosure.

FIG. 5 is a block diagram showing an embodiment of a control system 60 for controlling the spectrum assignments of various optical devices in a telecommunications network. In this embodiment, a plurality of nodes 62 are arranged in any configuration within a telecommunications network. Each of the nodes 62 may be configured to communicate with one or more of its neighboring nodes 62 in either a unidirectional or bi-directional manner. The control system 60 includes a spectrum management controller 64 configured in a control plane to provide control signals to at least a pair of neighboring nodes 62. The nodes 62 receiving the control signals are configured to operate in accordance with spectrum assignments created by the spectrum management controller 64, as mentioned in the present disclosure.

In particular, the spectrum assignments established by the spectrum management controller 64 may be configured such that line devices of the nodes 62 may operate according to a first spectrum assignment, and add/drop devices of the nodes 62 may operate according to a second spectrum assignment. As described in more detail below, the changes in the spectrum assignment throughout each particular node 62 may be made to allow the nodes to more efficiently utilize the available spectrum. As shown in FIG. 5, the spectrum management controller 64 supplies control signals to each of the nodes 62 in at least one portion of the telecommunication network.

In this embodiment, the spectrum management controller 64 is shown as being separate from each of the nodes 62. The spectrum management controller 64 may be configured as a Software-Defined Networking (SDN) controller. In this sense, the spectrum management controller 64 may be a global computer system having a centralized location for providing control to a plurality of nodes 62. However, in other embodiments, the spectrum management controller 64 may be incorporated within one or more nodes 62 for allowing control on a local basis. For instance, the spectrum management controller 64 may be associated with a shelf processor for local control processes.

Figure 6:
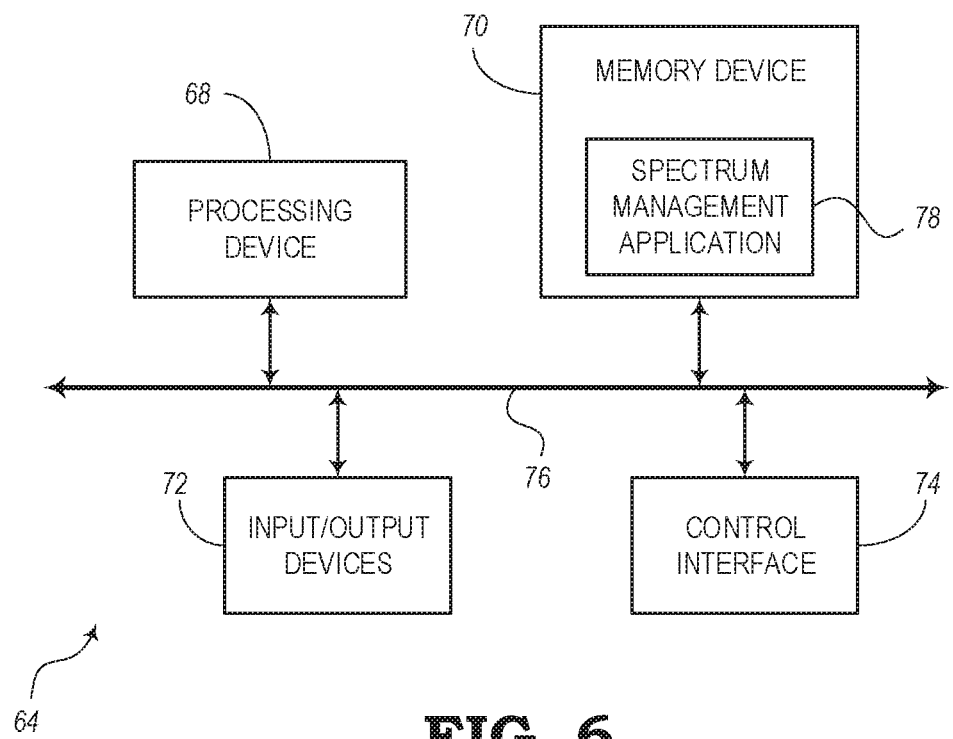
FIG. 6 is a block diagram illustrating the spectrum management controller shown in FIG. 5, according to various embodiments.

FIG. 6 is a block diagram showing an embodiment of the spectrum management controller 64 shown in FIG. 5. As mentioned above, the spectrum management controller 64 may be configured to supply control signals to at least a pair of neighboring nodes to enable the nodes to operate in a more spectrally efficient manner. The spectrum management controller 64 is configured to create spectrum assignments, as described in more detail below. The spectrum assignments, for example, may include reallocation processes for allowing add/drop devices of a node to abide by different spectrum assignment rules than the rules used for the line devices of the node.

In some embodiments, the spectrum management controller 64 may be a global component and may be part of an SDN controller for controlling multiple nodes. In other embodiments, the spectrum management controller 64 may be a local controller for controlling a single node and may be part of a shelf processor or part of an optical network element, such as the optical network element described below with respect to FIG. 7. When deployed locally, the spectrum management controller 64 may communicate with other neighboring spectrum management controllers to allow the same spectrum management protocols in each node. However, as will be more apparent from an understanding of the present disclosure, the spectrum management controller 64 may be configured for controlling the spectrum assignments of only a single network element.

Those skilled in the pertinent art will appreciate that various embodiments may be described in terms of logical blocks, modules, circuits, algorithms, steps, and sequences of actions, which may be performed or otherwise controlled with a general-purpose processor, a DSP, an application-specific integrated circuit (ASIC), a field-programmable gate array, programmable logic devices, discrete gates, transistor logic, discrete hardware components, elements associated with a computing device, or any suitable combination thereof designed to perform or otherwise control the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, those skilled in the pertinent art will appreciate that the various illustrative logical blocks, modules, circuits, algorithms, and steps described in connection with the embodiments described in the present disclosure may be implemented as electronic hardware, computer software, or any suitable combinations thereof. To clearly illustrate this interchangeability of hardware and software, various illustrative components, blocks, modules, circuits, algorithms, and steps have been described herein in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action.

The methods, sequences and/or algorithms described in connection with the embodiments disclosed herein may be embodied directly in hardware, in a software module executed by a processor, or any suitable combination thereof. Software modules may reside in memory controllers, DDR memory, RAM, flash memory, ROM, electrically programmable ROM memory (EPROM), electrically erase programmable ROM (EEPROM), registers, hard disks, removable disks, CD-ROMs, or any other storage medium known in the art or storage medium that may be developed in the future. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other computing device. In the alternative, the processor and the storage medium may reside as discrete components in a user terminal or other computing device.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both storage media and communication media, including any medium that facilitates transferring a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage, or other magnetic storage devices or media that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The block diagram of FIG. 6 shows an embodiment of the spectrum management controller 64 for assigning spectrum allocation rules within a telecommunications network. In the illustrated embodiment, the spectrum management controller 64 may be a digital computer that, in terms of hardware architecture, generally includes a processing device 68, a memory device 70, input/output (I/O) interfaces 72, and a control interface 74. The memory device 70 may include a data store, database, or the like. It should be appreciated by those of ordinary skill in the art that FIG. 6 depicts the spectrum management controller 64 in a simplified manner, where practical embodiments may include additional components and suitably configured processing logic to support known or conventional operating features that are not described in detail herein.

The components (i.e., the processing device 68, memory device 70, I/O interfaces 72, and control interface 74) are communicatively coupled via a local interface 76. The local interface 76 may be, for example, but not limited to, one or more buses or other wired or wireless connections. The local interface 76 may have additional elements, which are omitted for simplicity, such as controllers, buffers, caches, drivers, repeaters, receivers, among other elements, to enable communications. Further, the local interface 76 may include address, control, and/or data connections to enable appropriate communications among the components 68, 70, 72, 74.

The processing device 68 is a hardware device adapted for at least executing software instructions. The processing device 68 may be any custom made or commercially available processor, a central processing unit (CPU), an auxiliary processor among several processors associated with the spectrum management controller 64, a semiconductor-based microprocessor (in the form of a microchip or chipset), or generally any device for executing software instructions. When the spectrum management controller 64 is in operation, the processing device 68 may be configured to execute software stored within the memory device 70, to communicate data to and from the memory device 70, and to generally control operations of the spectrum management controller 64 pursuant to the software instructions.

It will be appreciated that some embodiments of the processing device 68 described herein may include one or more generic or specialized processors (e.g., microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), and the like). The processing device 68 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry or logic" that is "configured to or adapted to" perform a set of operations, steps, methods, processes, algorithms, functions, techniques, etc., on digital and/or analog signals as described herein for the various embodiments.

The I/O interfaces 72 may be used to receive user input from and/or for providing system output to one or more devices or components. The user input may be provided via, for example, a keyboard, touchpad, a mouse, and/or other input receiving devices. The system output may be provided via a display device, monitor, graphical user interface (GUI), a printer, and/or other user output devices. I/O interfaces 72 may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, and/or a universal serial bus (USB) interface.

The control interface 74 may be used to enable the spectrum management controller 64 to communicate over a network, such as the telecommunications network 10, the Internet, a wide area network (WAN), a local area network (LAN), and the like, to provide control signals to the various nodes 62. The control interface 74 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The control interface 74 may include address, control, and/or data connections to enable appropriate communications on the telecommunications network 10.

The memory device 70 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the memory device 70 may incorporate electronic, magnetic, optical, and/or other types of storage media. The memory device 70 may have a distributed architecture, where various components are situated remotely from one another, but can be accessed by the processing device 68.

The software in memory device 70 may include one or more software programs, each of which may include an ordered listing of executable instructions for implementing logical functions. For example, the memory device 70 may include a spectrum management application 78. Also, the software in the memory device 70 may also include a suitable operating system (O/S) and one or more computer programs. The operating system (O/S) essentially controls the execution of other computer programs, and provides scheduling, input-output control, file and data management, memory management, and communication control and related services. The computer programs may be configured to implement the various processes, algorithms, methods, techniques, etc. described herein.

The memory device 70 may include a data store used to store data. In one example, the data store may be located internal to the spectrum management controller 64 and may include, for example, an internal hard drive connected to the local interface 76 in the spectrum management controller 64. Additionally, in another embodiment, the data store may be located external to the spectrum management controller 64 and may include, for example, an external hard drive connected to the I/O interfaces 76 (e.g., SCSI or USB connection). In a further embodiment, the data store may be connected to the spectrum management controller 64 through a network and may include, for example, a network-attached file server.

Moreover, some embodiments may include a non-transitory computer-readable storage medium having computer readable code stored in the memory device 70 for programming the spectrum management application 78 or another processor-equipped computer, server, appliance, device, circuit, etc., to perform functions as described herein. Examples of such non-transitory computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by the processing device 68 that, in response to such execution, cause the processing device 68 to perform a set of operations, steps, methods, processes, algorithms, functions, techniques, etc. as described herein for the various embodiments.

Utilizing Spectrum Assignments

Figure 7:
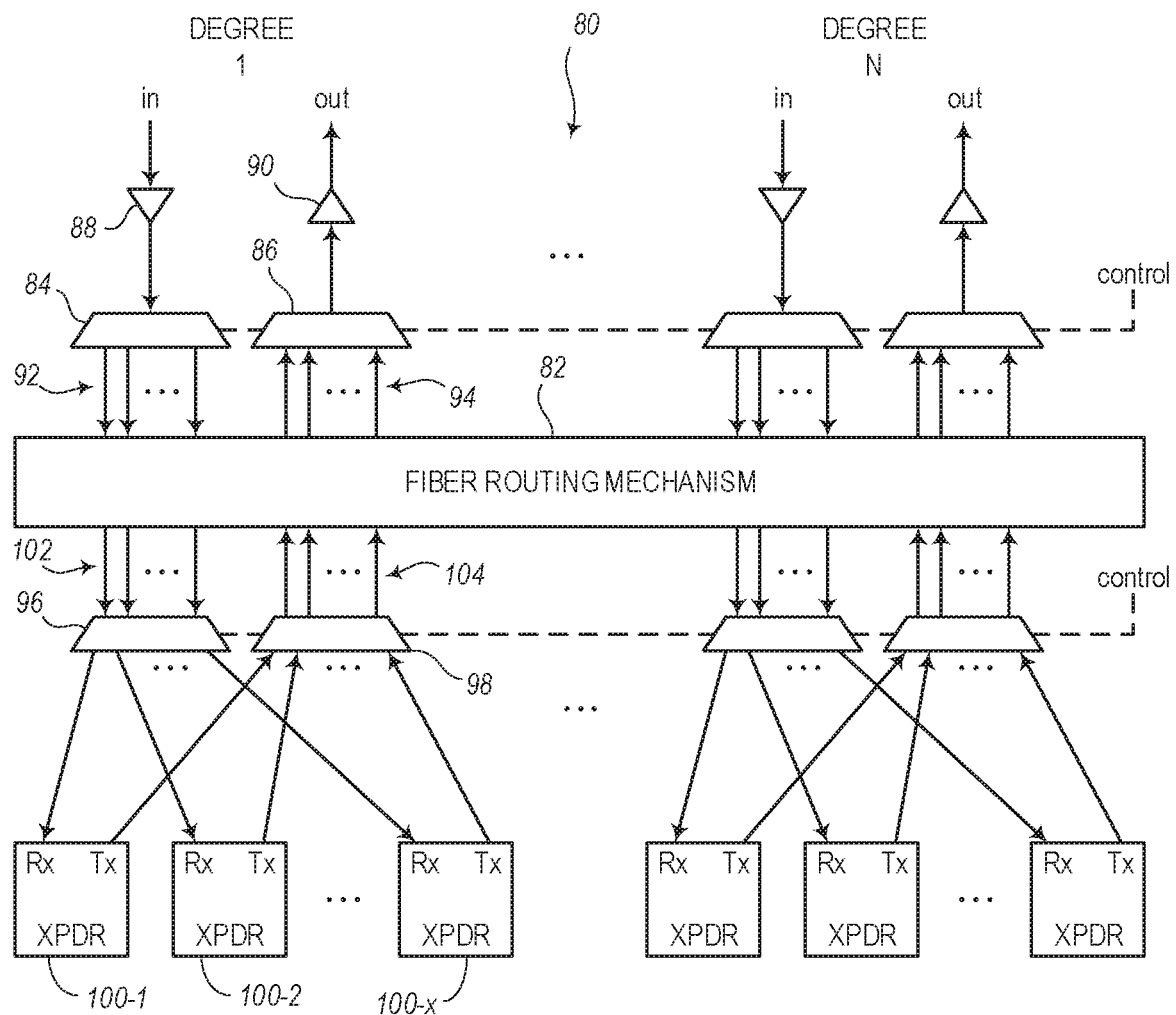
FIG. 7 is a block diagram illustrating an optical network element configured to operate in accordance with control signals from the spectrum management controller shown in FIGS. 5-6, according to various embodiments of the present disclosure.

FIG. 7 is a block diagram of an embodiment of an optical network element 80 for utilizing an efficient spectrum assignment protocol when operating in a flexible network. As opposed to conventional flexible networks, the optical network element 80 allows flexibility with respect to the spectrum assignment in "line" devices of the optical network element 80 and flexibility with respect to the spectrum assignment in "add/drop" devices of the optical network element 80. The optical network element 80, according to various embodiments of the present disclosure, includes a fiber routing mechanism 82 that separates the line devices from the add/drop devices. The fiber routing mechanism 82 may be configured to hide the physical complexities in the local fiber routing.

A first set of control signals are supplied to the line devices 84, 86 for allocating one spectrum assignment thereto, and a second set of control signals are supplied to the add/drop devices 96, 98 for allocating another spectrum assignment. The first and second sets of control signals may be provided by the control interface 74 of the spectrum management controller 64. As mentioned above, the spectrum management controller 64 may provide global control signals from the control interface 74 when the spectrum management controller 64 is configured as an SDN controller that controls multiple nodes. Alternatively, the sets of control signals may be initiated within the optical network element 80 itself or other local control devices to manage spectrum assignments for the line devices and add/drop devices.

In this embodiment, the optical network element 80 may include any number (N) of degrees for optical communication with two or more external devices within an optical telecommunication network. Although the devices of the first degree are described below, it should be understood that the other components, elements, devices with respect to the other degrees of the optical network element 80 may be the same or similar to the first degree devices.

Thus, each degree may include "line" devices for communication along the respective line or degree. The line devices may include a Wavelength Selective Switching (WSS) demultiplexer 84 and a WSS multiplexer 86. The WSS demultiplexer 84 and WSS multiplexer 86 may communicate along the respective degree or line via amplifiers, such as an input amplifier 88 and an output amplifier 90. The line devices 84, 86 receive control signals, which cause the line devices 84, 86 to operate according to a first spectrum assignment. A plurality of input optical channels 92 are supplied from the WSS demultiplexer 84 to the fiber routing mechanism 82. Also, a plurality of output optical channels 94 are supplied from the fiber routing mechanism 82 to the WSS multiplexer 86.

The optical network element 80 also includes "add/drop" devices. For example, the add/drop devices may include a splitter-based colorless-channel demultiplexer 96, a splitter-based colorless-channel multiplexer 98, and a number (x) of transponders 100-1, 100-2, . . . , 100-x. Since the demux 96 and mux 98 are configured as "colorless-channel" devices, each port of the devices can be any wavelength or spectrum and is able to colorlessly add or drop channels. The demultiplexer 96 and multiplexer 98 may alternatively be configured as multi-case broadband switches. The add/drop devices 96, 98 receive a second set of control signals (e.g., from the control interface 74 of the spectrum management controller 64), which cause the add/drop devices 96, 98 to operate according to a second spectrum assignment that may be different from the first spectrum assignment.

A plurality of optical add/drop channels 102 are supplied from the fiber routing mechanism 82 to the demultiplexer 96. Also, a plurality of optical add/drop channels 104 are supplied from the multiplexer 98 to the fiber routing mechanism 82. The demultiplexer 96 provides signals to a receiver portion of each of the multiple transponders 100. Also, a transmitter portion of each of the multiple transponders 100 provides signals to the multiplexer 98.

Spectrum Management

The spectrum management application 78 shown in FIG. 6 may be configured to allocate spectrum assignments to various portions of the optical network element 80. For example, the spectrum management application 78 may provide control signals to the line devices (e.g., WSS demultiplexer 84, WSS multiplexer 86, etc.) for defining the allocation of a first spectrum assignment to the line devices 84, 86, which are configured for communication along the respective line/degree to one or more other nodes. The spectrum management application 78 also provides control signals to the add/drop devices (e.g., demultiplexer 96, multiplexer 98, etc.) for defining the allocation of a second spectrum assignment to the add/drop devices 96, 98 configured for adding and/or dropping optical channels. For instance, the first and second spectrum assignments may be different from each other to allow for efficient use of the spectrum without wasted bandwidth.

While the spectrum management application 78 can allocate the various spectrum assignments for different parts of the optical network element 80, the spectrum management application 78 can keep the spectrum assignment for use by a first group of devices hidden from the other devices and vice versa. The spectrum management application 78 may use a bandwidth calculation formula or algorithm for creating the various spectrum assignments for defining the various parts of the entire Media Channel (MC). For example, the optical signals on the incoming MC may include one or more Network Media Channels (NMCs) that include an optical channel. The MC also includes deadbands at the ends thereof and one or more guardbands separate the multiple NMCs or channels. In a flexible system, the bandwidths of the different optical channels (i.e., NMCs) may be different and the guardband between neighboring NMCs may also be different.

The spectrum management application 78 may be configured to take the multiple NMCs on a single MC arriving along the line or degree and then enforce the separation of the NMCs such that each NMC is placed on its own MC when the optical signals are transmitted to the add/drop devices. This differs from the conventional systems in which the same spectrum assignment for the MC is the same throughout the entire optical network element. However, in the present disclosure, the spectrum management application 78 is configured to allow different allocations between the line/degree devices and the add/drop devices. In this respect, the optical network element 80 of the present disclosure include flexibility throughout its entire path. In other words, the internal elements of the optical network element 80 have flexibility with respect to spectrum allocation.

Furthermore, the line devices may include a spectrum resolution with respect to the different wave characteristics (e.g., waveband channels, deadbands at the ends of the MC, guardbands between the waveband channels, channel spacing, etc.) and this resolution may include a specific lowest common multiple. Likewise, in the add/drop devices, another spectrum resolution may apply with a different lowest common multiple. These lowest common multiples may be used by the spectrum management application 78 in some embodiments to calculate a lowest common multiple to be applied to both spectrum assignments.

The efficient allocation of spectrum assignments may be applied by the spectrum management application 78 to the various portions of the optical network element 80. To minimize spectral allocation, the spectrum management application 78 may be configured to perform a frequency shift of the wave characteristics (e.g., waveband channels, deadbands, guardbands, channel spacing, etc.) for transitioning signals from one portion of the optical network element 80 to the other. The frequency shift can be applied to avoid overlap of the MCs over the add/drop devices.

In addition, the spectrum management application 78 of the present disclosure may be configured to derive the NMC boundaries or edges in the add/drop devices by adding a required deadband over the add/drop devices. Then, the spectrum management application 78 may further provide a snapping action to snap the boundaries or edges of the NMCs to the nearest spectral resolution (or granularity) supported by the add/drop devices. In particular, the add/drop devices do not include selective spectrum components, such as WSS, but may be configured as colorless mux/demux devices.

Therefore, according to some embodiments, an optical routing protocol and/or a software program stored in a non-transitory computer-readable medium may be provided for allocating spectrum throughout an optical network element. For example, a software program (e.g., spectrum management application 78) associated with an optical network element (e.g., optical network element 80) may be configured with first and second modules, where the first module of the spectrum management application 78 may be configured to allocate a first spectrum assignment to control the routing of optical signals through the line devices. Likewise, the second module may be configured to allocate a second spectrum assignment to control the routing of the optical signal through the add/drop devices, where the second spectrum assignment may be different from the first spectrum assignment.

Regarding the various modules of the spectrum management application 78, the second module may be configured to allocate the second spectrum assignment to be different from the first spectrum assignment with respect to one or more of bandwidths of optical channels of the optical signals, deadbands of the optical signals, and guardbands of the optical signals. The first module may be configured to calculate a minimum frequency allocation resolution of at least one of the bandwidths, deadbands, and guardbands. Furthermore, the second module may be configured to derive edges of one or more NMCs for routing according to the second spectrum assignment by adding the bandwidths, deadbands, and guardbands of NMCs being routed according to the first spectrum assignment and snapping the edges to a minimum actuator resolution of the line devices. The minimum actuator resolution may be based on a least common multiple of the bandwidths, deadbands, and guardbands.

Also, according to various embodiments of the present disclosure, an optical network element (e.g., optical network element 80) may be configured to provide various functions for allocating various spectrum assignments to different portions of the optical network element 80. For example, the optical network element 80 may include line devices (e.g., WSS demultiplexer 84, WSS multiplexer 86, etc.) configured to communicate optical signals with external network elements along one or more degrees. The optical network element 80 in these embodiments may further include add/drop devices (e.g., demultiplexer 96, multiplexer 98, etc.) configured to perform at least one of adding one or more optical channels to the optical signals and removing one or more optical channels to the optical signals. The optical network element 80 in this embodiment may further comprise the spectrum management application 78, as described above. For example, the spectrum management application may be executed locally in the optical network element, such as by using a shelf processor associated with the optical network element. The spectrum management application 78 may be configured to allocate a first spectrum assignment for routing the optical signals through the line devices and further configured to allocate a second spectrum assignment for routing the optical signals through the add/drop devices. In particular, the second spectrum assignment may be different from the first spectrum assignment.

Moreover, the optical network element 80 may be configured whereby the spectrum management application 78 enforces Dense Wavelength Division Multiplexing (DWDM) to provide end-to-end flexible routing of the optical signals through the optical network element 80. The line devices may include at least one spectrum-selective switching device (e.g., WSS). The add/drop devices may be colorless, directionless, and contentionless (CDC) components.

The first spectrum assignment may allow a plurality of NMCs to be confined in one MC. The second spectrum assignment may configure each NMC to be routed in its own individual MC. The add/drop devices may include one or more pre-combiners (as described below) and one or more colorless-channel multiplexer/demultiplexer. The one or more pre-combiners may be configured to accommodate the plurality of NMCs into the same add port of the colorless multiplexer. A plurality of MCs and the respective NMCs of the MCs from the add/drop devices are accommodated into a single MC in a Wavelength Selective Switch (WSS) of the line devices.

Pre-Combiner and Cascaded Colorless Multiplexer/Demultiplexers

Figure 8:
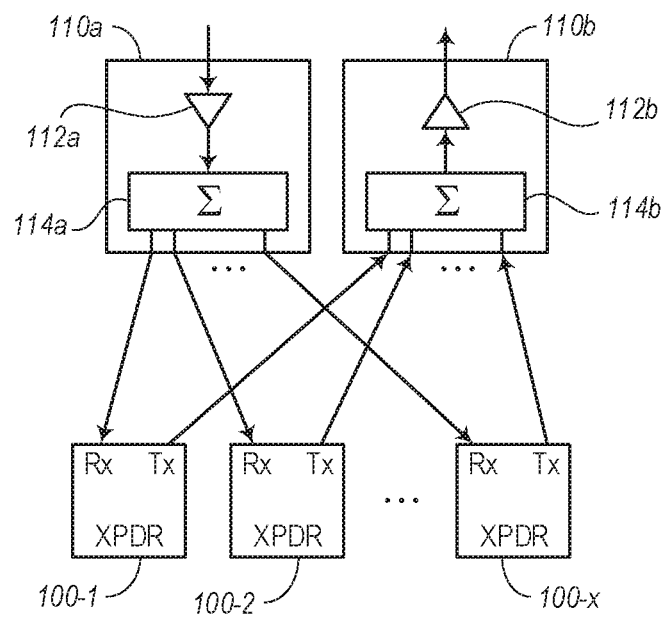
FIG. 8 is a block diagram illustrating a pre-combiner of add/drop devices of the optical network element of FIG. 7, according to various embodiments.

FIG. 8 is a block diagram showing an embodiment of pre-combiners 110 of the add/drop devices of the optical network element 80. A first pre-combiner 110a may be an embodiment of the demultiplexer 96 shown in FIG. 7. A second pre-combiner 110b may be an embodiment of the multiplexer 98 shown in FIG. 7. In this embodiment, the first pre-combiner 110a includes a pre-amplifier 112a and a first summing device 114a. The second pre-combiner 110b includes a second summing device 114b and a post-amplifier 112b.

The presence of the pre-combiner 110 before the WSS-based contentionless and colorless mux/demux devices allows a plurality of NMCs to be packaged in a single MC on the add/drop devices. A plurality of MCs from the add/drop devices can then be packaged together to co-route them in a single line-MC. In such a case, the spectrum for the NMCs within an add/drop device MC can be assigned following the usual channel spacing without any resolution restrictions, while the systems of the present disclosure are configured to perform the necessary frequency shift for NMCs coming in two different add/drop ports in order to avoid MC overlaps within the add/drop devices.

The methods of the present disclosure are also configured to create a spectrum assignment for cascaded WSS-based contentionless add/drop devices. In this case, the deadband on the add/drop portion of the MC can still be reduced to a value lower than line-MC deadbands to improve spectral efficiency. However, it may not always be possible to set the add/drop deadbands to 0 GHz to avoid potential cascaded filter roll-off penalties.

Spectrum Assignments

Figure 9:
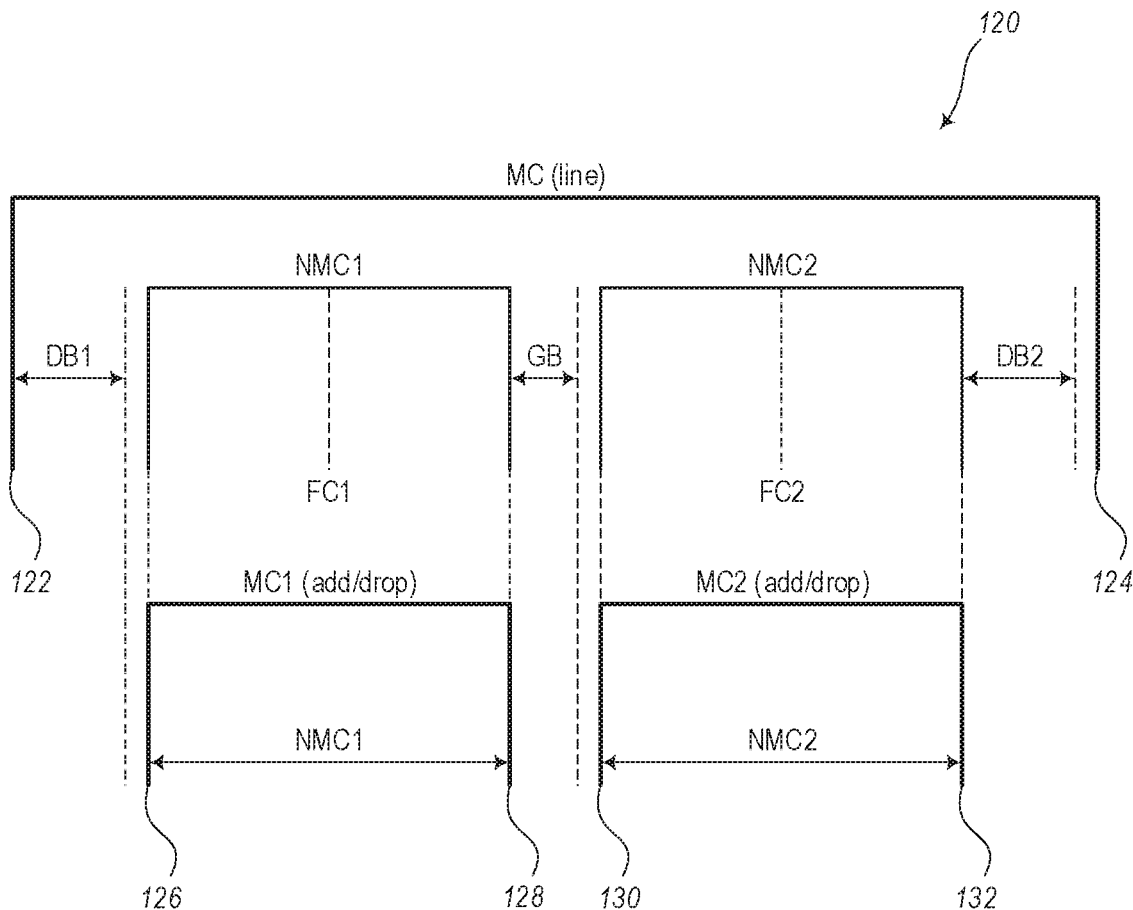
FIG. 9 is a diagram illustrating a spectrum assignment for the optical network element of FIG. 7 for application in a flexible channel network, according to various embodiments.

FIG. 9 is a diagram illustrating an embodiment of a spectrum assignment 120 for the optical network element 80 of FIG. 7 configured in a flexible network arrangement. The spectrum assignment 120 includes a Media Channel (MC) that spans the entire spectrum. The MC is the spectrum associated with the line devices of the optical network element 80 of FIG. 7. A first deadband DB1 and a second deadband DB2 are formed at the ends of the MC. In this example, two Network Media Channels (i.e., NMC1 and NMC2) are allocated within the MC (line) with a guardband GB between them.

According to the various embodiments of the present disclosure, the NMCs are divided such that each NMC can be contained within its own Media Channel. For instance, NMC1 (on the line) is transferred to a first MC (i.e., MC1) on the add/drop portion of the optical network element 80. Also, NMC2 is transferred onto its own MC, which is a second MC (i.e., MC2) that is also used on the add/drop portion of the optical network element 80. In other words, the top portion of FIG. 9 shows the MC (line) that is used in the line devices. The bottom portion of FIG. 9 shows the MCs (i.e., MC (add/drop) and MC2 (add/drop)) that are used in the add/drop devices. The MC1 (add/drop) maintains the same bandwidth and center frequency (i.e., FC1) from the NMC1 (line) and the MC2 (add/drop) maintains the same bandwidth and center frequency (i.e., FC2) from the NMC2 (line).

The MC represents the contiguous filter width in a spectrum selective switching device (e.g., WSS demultiplexer 84) of the optical network element 80 or switch. The MC is defined between an input and output port with start and stop frequencies. The MC may represent a single NMC, a plurality of NMCs sharing the same switch ports along the route, or a super-channel. The MC may be created per optical component (i.e., spectrum selective switching element). The MC bandwidth for a given set of channels can be different over different spectrum switching elements based on each element's resolution and deadband requirements. The deadband may refer to the bandwidth allocated on each edge of an MC to avoid filter roll-off penalties on the NMCs. Deadbands are part of the MC bandwidth.

The NMCs represent end-to-end channel objects that maintain the same center frequency and the bandwidth along every component along the route in the line devices and in the add/drop devices. The NMC portion of the MC may represent a single channel or a super-channel formed with a plurality of sub-carriers sharing the same optical payload. NMCs are defined in terms of their bandwidths and center frequencies and are symmetrical around their center frequencies.

The MC are further defined by channel spacings, which are the frequency spacings between the center frequencies of two neighboring NMCs. Guardbands may be defined as the spectral gap between two neighboring NMCs that share the same MC. The guardbands are not part of NMC bandwidths but contribute to the MC bandwidth.

The optical network element 80 of FIG. 7, along with the spectrum assignment 120 of FIG. 9 provide an "all-flexible" network, where the flexibility of MC characteristics is not specifically defined only by line devices but includes a flexible grid from end to end in the optical network element 80. That is, there are no fixed grid or fixed filter elements along the channel path, including the add/drop devices. For example, the optical network element spectrum selective switching devices (e.g., WSS devices) which are present at both the backbone elements (i.e., the line (degree) devices) as well as the add/drop devices. The spectrum selective switching devices may include contentionless and colorless mux/demux structure (such as in WSS-based contentionless add/drop devices).

As a result of the all-flexible network described herein, one aspect of the spectrum assignment 120 that differs from conventional systems is that the minimum actuator bandwidth (or pixel resolution) that a WSS line device can effectively control can be different than the minimum actuator bandwidth that a WSS add/drop device can control. Therefore, the spectrum assignment 120, as shown in FIG. 9, includes a top portion and a bottom portion, where the top portion represents the assignment for the WSS line devices, and the bottom portion represents the assignment for the WSS add/drop devices.

As opposed to the conventional system in which the MC is the same throughout the network element (and is dictated by the line devices), the optical network element 80 of the present disclosure allows the line devices to operate under a first assignment and the add/drop devices to operate under a second assignment, where the first and second assignments may be different. For the WSS-based contentionless add/drop devices, NMCs coming on different Tx input ports are incorporated into their own MCs (i.e., 1×NMC/MC), while a plurality of NMCs coming from an add/drop device to a single line WSS switch input port can be incorporated into a single MC.

Individual MC edges 122, 124 (shown in FIG. 9) in this embodiment are snapped to the supported pixel granularity (e.g., the least common multiple) of each spectrum selective switching component in the line devices and add/drop devices. The spectrum management application 78 may be configured to achieve different deadbands (e.g., DB1 and DB2) in the MC to avoid filter roll-off penalties over the line devices versus the add/drop devices due to different pixel resolution and link budget tolerance therebetween.

In addition, by using the pre-combiners 110a, 110b (FIG. 8) before the contentionless and colorless mux/demux, a plurality of NMCs can be accommodated into the same add port 114a, 114b of an add/drop device, and hence, into the same MC of that add/drop device, while a plurality of MCs (and their NMCs) from an add/drop device can be accommodated into a single MC in the WSS line devices.

Conventional systems in the field of optical telecommunications do not address spectrum assignment in an all-flexible network, where the spectrum-selective switching components (e.g., WSS devices) of the add/drop portion of the optical network element 80 is capable of operating in a different resolution than the line devices and may have different deadband constraints than those of the line devices. For the case of assigning spectrum for a plurality of co-routed NMCs (or super-channels that can be accommodated to the same line-facing MC), the optical network element 80 can include a spectrum assignment 120 that can accommodated NMCs into individual MCs in the add/drop devices due to the presence of WSS devices inside the add/drop devices.

In FIG. 9, the MC edges 122, 124 are snapped to the WSS line granularity. The edges 126, 128 of the MC1 (add/drop) are snapped to the CMD WSS granularity of the NMC1. Also, the edges 130, 132 of the MC2 (add/drop) are snapped to the CMD WSS granularity of the NMC2.

The line MC on the line-facing degree WSS devices 84, 86 maintains the line deadband and minimum channel spacing and guardband characteristics and snaps to the line WSS supported the minimum resolution (e.g., the granularity of pixel assignment). In the WSS add/drop devices 96, 98, each NMC coming to a different switch port is accommodated on its own MC, where each MC may have different deadband characteristics than the line MC and may be snapped to the minimum resolution of the CMD WSS or the granularity supported by the CMD WSS for pixel assignment.

Figure 10:
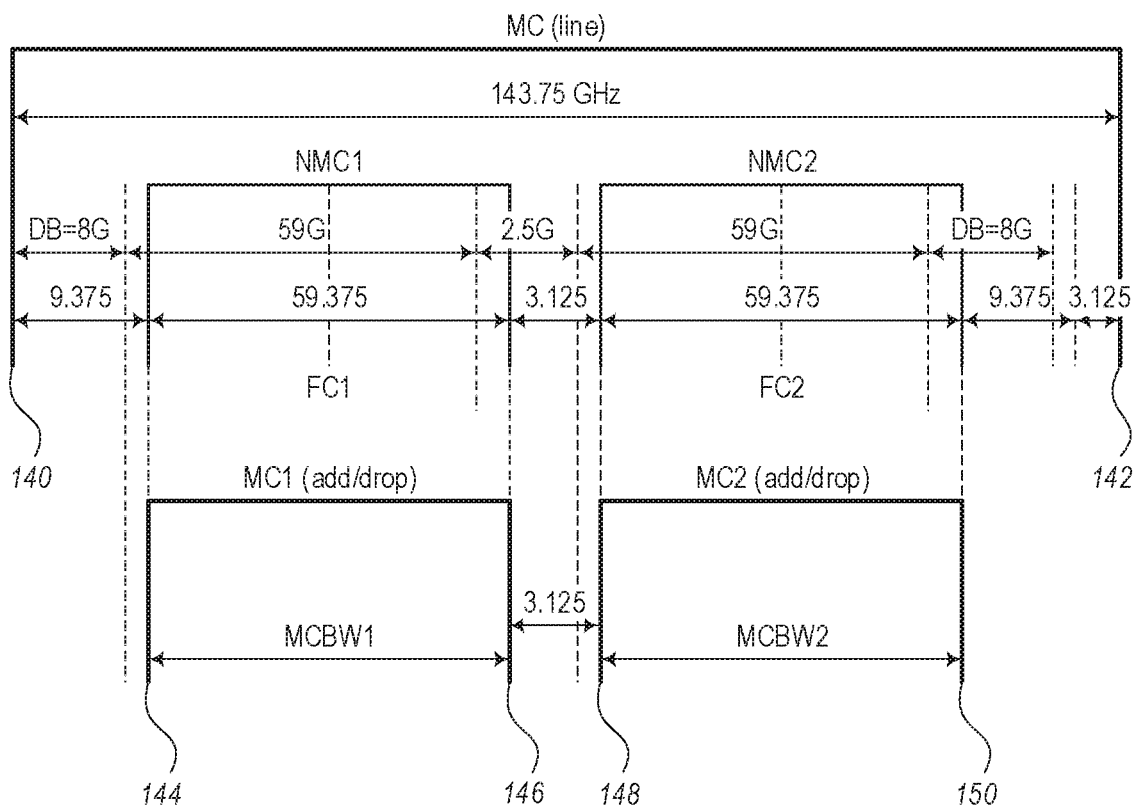
FIG. 10 is a diagram illustrating another spectrum assignment for the optical network element of FIG. 7 for application in a flexible channel network, according to various embodiments.

FIG. 10 is a diagram illustrating another spectrum assignment created by the spectrum management controller 64 shown in FIGS. 5-6. The optical network element 80 is able to operate under a spectrum assignment 140. In this example, two NMCs (i.e., NMC1 and NMC2) in the same line MC are placed in 61.5 GHz spacing with a 2.5 GHz guardband in between the NMC boundaries. The line WSS devices are configured in this example to operate in a 6.25 GHz granularity, where each band (e.g., deadbands, guardbands, and bandwidths) is a multiple of 6.25 GHz. Each NMC occupies an MC in the WSS add/drop devices that operate with a 3.125 GHz granularity.

An 8 GHz deadband is allocated on each edge of the line MC to avoid filter roll-off penalties. No deadband is allocated (0 GHz) for add/drop devices. Provisionable bandwidth parameters may be recommended by planning or link budget tools. For example, the deadband may be recommended at 8 GHz on each edge of line-MC; each minimum NMC bandwidth may be 59 GHz; the minimum channel spacing may be 61.5 GHz, where the minimum guardband between the two NMCs in the line MC may be 2.5 GHz; and the deadband for the add/drop portion of the assignment 140 may be 0 GHz.

With this approach, the spectrum management controller 64 may be configured to round up each bandwidth parameter to match a multiple of the lowest resolution. In this case, the lowest resolution (as established by the add/drop portion) is 3.125 GHz. Thus, the overall MC bandwidth becomes 143.75 GHz in this case, which may not necessarily be optimal from a spectrum efficiency point of view.

Since the line WSS devices follow a different resolution (or pixel granularity) than the add/drop WSS devices, a strategy of rounding up can be taken. The spectrum management controller 64 may also make each provisionable bandwidth parameter match the lowest common multiple of all the WSS possible resolutions.

For example, if the line-facing WSS devices 84, 86 have a resolution of 6.25 GHz, and the add/drop WSS devices 96, 98 have a resolution of 3.125 GHz, then the spectrum management controller 64 can make each bandwidth component of the spectrum assignment 140 related to channels as multiples of the resolution of 3.125 GHz. This includes readjusting the low and high-frequency deadbands on the line WSS to become multiples of the add/drop structure resolution (i.e., 3.125 GHz in this example) that can be equal to or higher than the actual link budget or signal bandwidth requirements. Also, the NMC bandwidths can be readjusted to become multiples of the add/drop structure resolution. Furthermore, the guardbands and/or channel spacings between NMCs can also be readjusted to become multiples of add/drop structure resolution.

In order to improve spectral efficiency, the deadband for each MC in the add/drop portion (e.g., MC1 and MC2) can be set lower than the deadband allocated for the line MC, keeping them either at 0 GHz or multiples of the lowest pixel resolution. This will add an additional link budget penalty due to filter roll-offs on each side of an MC. However, if only the deadbands at the add/drop MCs are reduced, then there is only 2 times the filter roll-off penalty to tolerate, which can be acceptable from a link budget point of view for most signal types. However, although the approach may simplify the spectrum assignment operation, it does not necessarily make the assignment spectral efficient for multi-NMC in an MC case.

Figure 11:
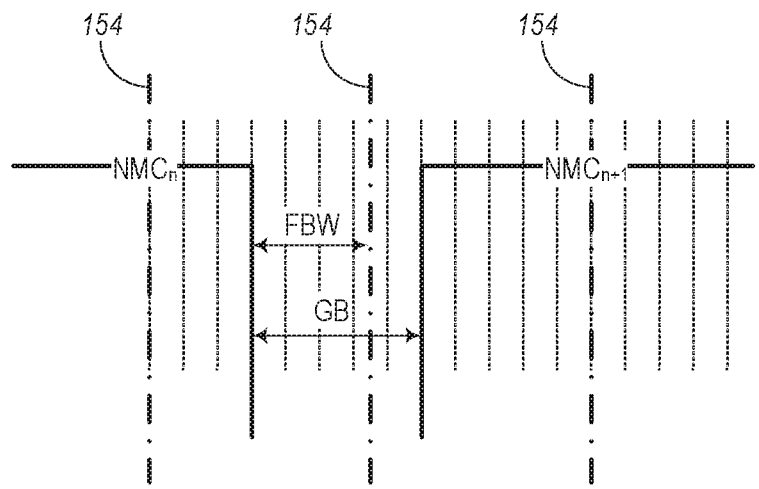
FIG. 11 is a diagram illustrating an example of snapping edges of wavebands for creating a spectrum assignment for the optical network element of FIG. 7, according to various embodiments.
Figure 12:
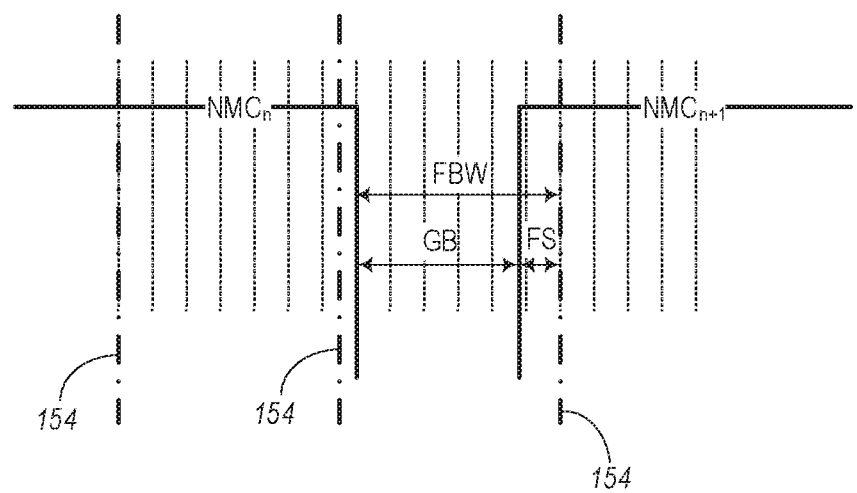
FIG. 12 is a diagram illustrating another example of snapping edges of wavebands for creating a spectrum assignment for the optical network element of FIG. 7, according to various embodiments.

FIG. 11 is a diagram showing an example of a snapping process for snapping edges of various wavebands (i.e., NMCs) to specific predetermined reference points on the spectrum. In this way, a spectrum assignment is created for the optical network element 80 of FIG. 7 (or another type of switch). Also, FIG. 12 shows another example of a snapping process to snap the edges of various wavebands to reference points for creating a spectrum assignment for the optical network element 80. The snapping process includes snapping the edges of each of the wavebands, guardbands, and deadbands to the least common multiple of a minimum bandwidth resolution used throughout the optical network element (e.g., optical network element 80).

In FIG. 11, a back end of an arbitrary NMC (e.g., $NMC_n$) and a front end of the next NMC (e.g., $NMC_{n+1}$) are shown. The lines 154 represent the multiples of the minimum bandwidth resolution to which the NMCs may be snapped. FIG. 11 also shows a Fill Bandwidth (FBW) and a guardband (GB).

One embodiment includes a method for snapping edges of an NMC to predetermined reference points on a spectrum for lining up with multiples of the lowest resolution in an "all-flexible" channel path. For example, the all-flexible channel path may be defined as the channel flexibility throughout the entire optical network element, including both the line elements and add/drop elements. The method may include a sequence of steps, such as providing a system to co-route a number (N) of NMCs in a single MC over the line-fiber, where N is greater than 1. The method may then include determining the minimum resolution, whereby the spectrum assignments for the MCs and NMCs over the line-facing spectrum-selective switching devices are dictated by the resolution and the deadband channel spacing constraints of the line-facing devices. Each of N×NMCs is accommodated on its own MC over the spectrum switching devices in the add/drop structure that maintains a different resolution and deadband than the line-facing switching devices. The channel spacing between the NMCs (or the guardband between two neighboring NMC edges) are shifted to avoid MC overlaps over the add/drop spectrum-selective switching devices.

The boundary or frequency edges of an individual MC in the add/drop structure for each of the N×NMCs are derived from the associated NMC boundaries by adding up the required deadband over the add/drop structure, and snapping each edge to the nearest resolution or pixel granularity supported by the add/drop spectrum selective switching elements.

In other words, for two neighboring NMCs (e.g., NMCn and NMCn+1) that can be accommodated in the same line-facing Media Channel (MC), if the allocated guardband between them is shorter than the additional bandwidth required for the add/drop MC to be snapped to its add/drop WSS granularity (denoted by FBW), then the guardband between the two NMCs can be dynamically extended to avoid MC overlaps over the add/drop structure. Where the dynamic frequency shift (FS), as shown in FIG. 12, or the extension of the guardband is calculated as the difference between the FBW and the allocated guardband (GB). In the case, where the allocated guardband is wider or equal to FBW, no frequency extension is required for the allocated guardband.

Figure 13:
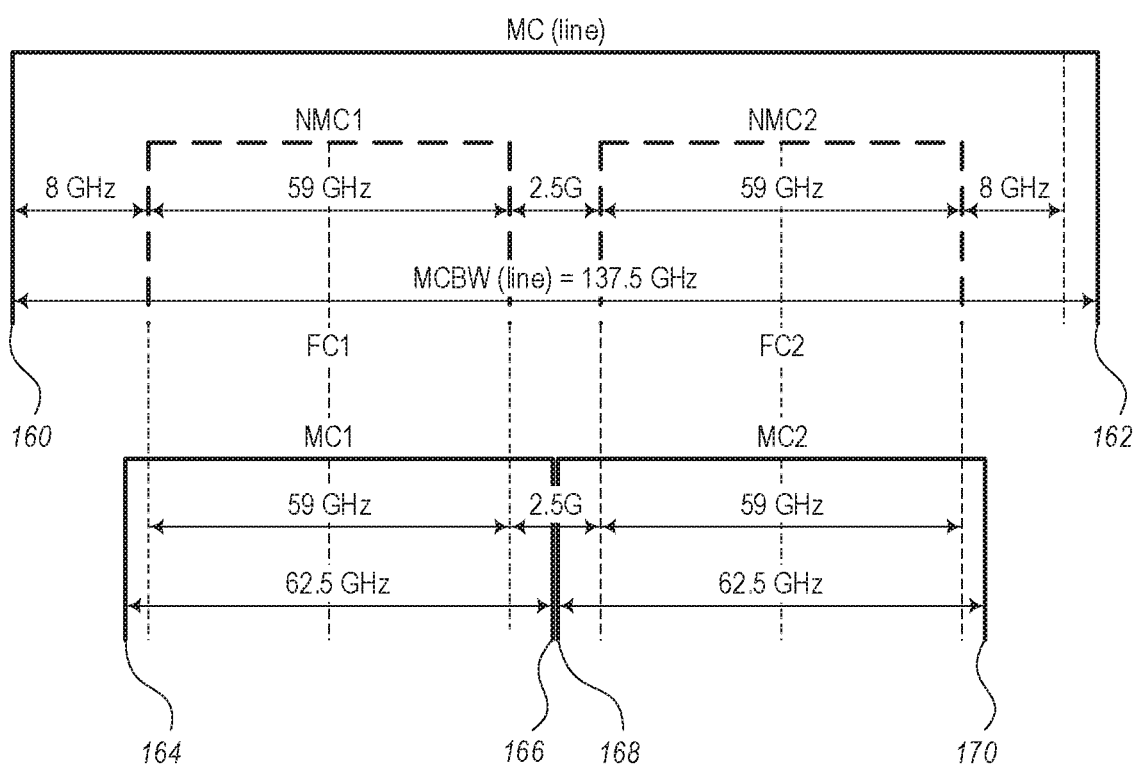
FIG. 13 is a diagram illustrating another spectrum assignment for the optical network element of FIG. 7 for application in a flexible channel network, according to various embodiments.
Figure 14:
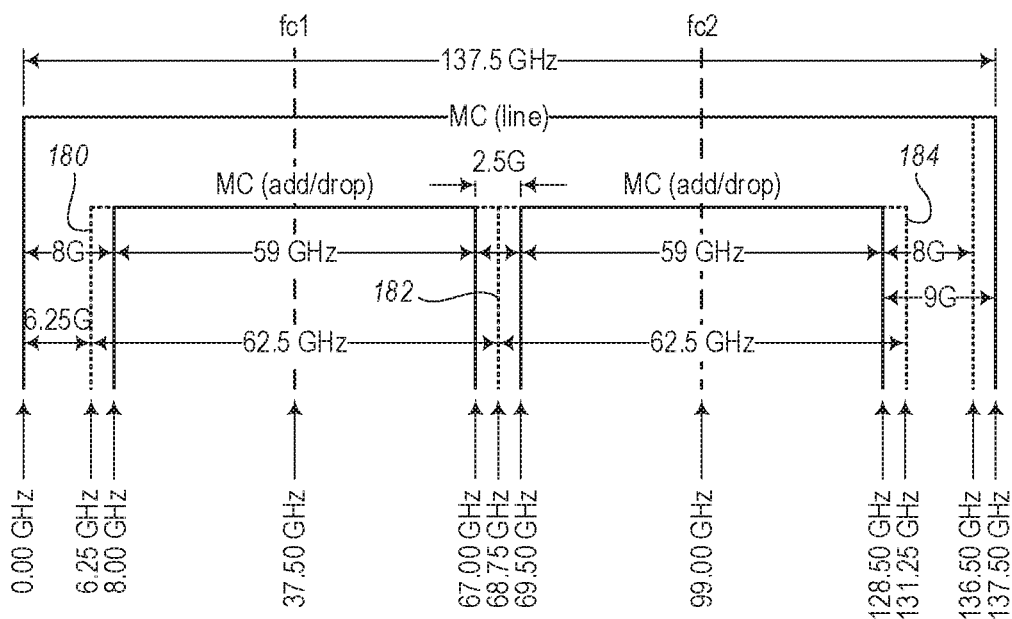
FIGS. 14-17 are diagrams illustrating other spectrum assignment characteristics for the optical network element of FIG. 7, according to various embodiments.

The frequency shift (FS) on the minimum supported channel spacing between NMCs (or the guardband between two neighboring NMC edges) can be calculated as follows:

for $N=1$, $FS_1=0$ GHz; for single NMC/MC, the frequency shift is irrelevant for $N=2$, $FS_2=\text{Max}(\text{RoundUP}_{AddDropResolution}(DB_{line}+NMCBW_1+DB_{1|AddDrop})-(DB_{line}+NMCBW_1+DB_{1|AddDrop}+\text{Max}(GB_1,GB_2)),0)$;

where, $FS_2$ is the frequency shift required for $NMC_2$ center frequency allocation, $DB_{line}$ is the deadband allocated for line-facing MC on one edge, $DB_{i|AddDrop}$ is the deadband allocated at the edge for the first NMC-MC over the add/drop structure;

for $N>2$, $FS_N=\text{Max}(\text{RoundUP}_{AddDropResolution}(DB_{line}+\Sigma_{i=1}^{N-1}(NMCBW_i+DB_{i|AddDrop})+\Sigma_{i=1}^{N-2}GB_i+\Sigma_{i=1}^{N-1}FS_i)-(DB_{line}+\Sigma_{i=1}^{N-1}(NMCBW_i+DB_{i|AddDrop})+\Sigma_{i=1}^{N-1}(GB_i+FS_i)),0)$;

FIG. 13 is a diagram showing another embodiment of a spectrum assignment created for the optical network element 80. In this embodiment, the spectrum assignment may be generated by placing two NMCs with 61.5 GHz channel spacing and a 2.5 GHz guardband in between the NMC boundaries. These NMCs are positioned in the same line MC, where the WSS line devices operate with a 6.25 GHz granularity. Each of the NMCs is separated by the spectrum management application 78 so as to occupy its own MC in the WSS add/drop devices that operate with a 3.125 GHz granularity. An 8 GHz deadband is allocated on each edge of the line MC to avoid filter roll-off penalties. However, no deadband is allocated (i.e., 0 GHz) for add/drop devices, as shown in the bottom portion of FIG. 13.

In this embodiment, the spectrum assignment as shown in FIG. 13 may be created by an algorithm operating in the spectrum management application 78 to achieve the same spectral efficiency for WSS-based contentionless and colorless mux/demux (or add/drop devices), which is shown at the bottom of FIG. 13, as the spectrum assignment for the MCs of splitter/combiner based add/drop devices that may be used in conventional systems. That is, the algorithm may be configured to abstract the complexities and constraints of WSS-based contentionless and colorless mux/demux devices from a spectrum assignment point-of-view for co-routing a plurality of NMCs in a single line-MC.

In both cases, the total spectrum required in the line for allocating two 56 G Baud signals with 8 GHz deadband on each side on the line is 137.5 GHz. For WSS-based contentionless and colorless mux/demux devices, each NMC has to occupy its own MC with a deadband of 0 GHz, an add/drop WSS resolution of 3.125 GHz, a line WSS resolution of 6.25 GHz, and 8 GHz of applicable deadband on each edge. For the multi-cast based (e.g., broadband spectral switching) contentionless add/drop devices, there is no constraint in resolution or deadbands over the add/drop devices. The line WSS operates at 6.25 GHz, and each NMC does not need a dedicated optical filter bandwidth or dedicated MC.

FIGS. 14-17 are diagrams illustrating still other embodiments of spectrum assignments for the optical network element 80. The MC (line) spectrum assignments should be distinguished from the MC (add/drop) spectrum assignments, where the MC (line) spectrum assignment include the entire MC pertaining to the optical signals on the line devices. The MC (add/drop) spectrum assignment include the separated MCs for each NMC as applied to the add/drop devices of the optical network element.

Figure 15:
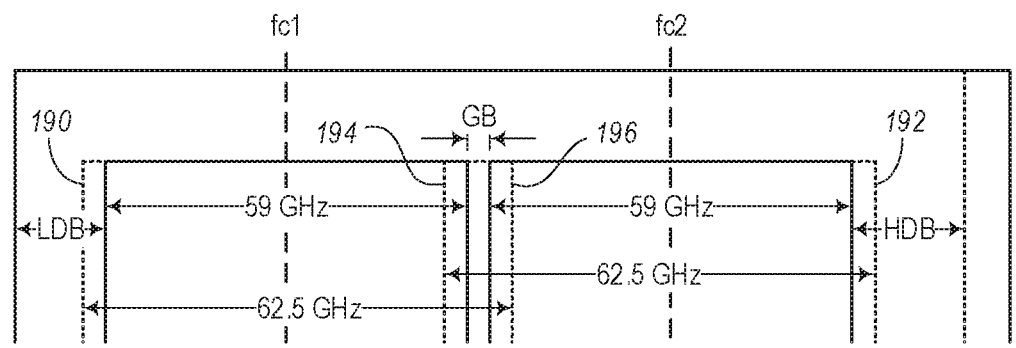
Figure 16:
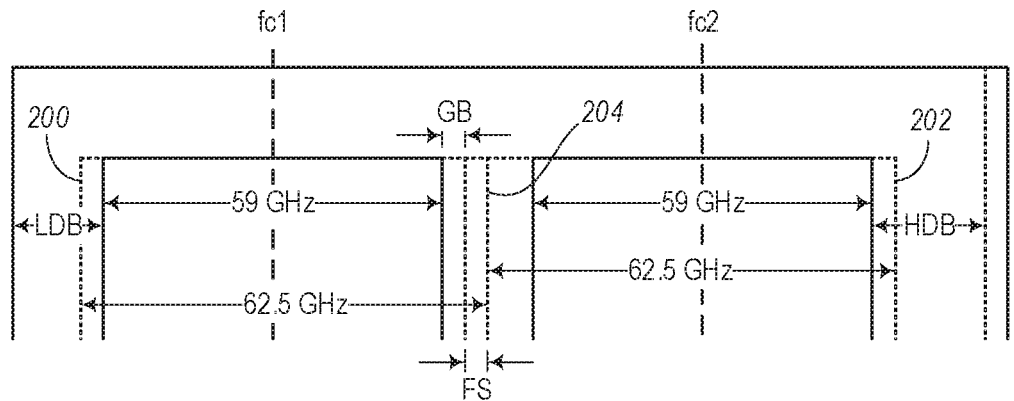
Figure 17:
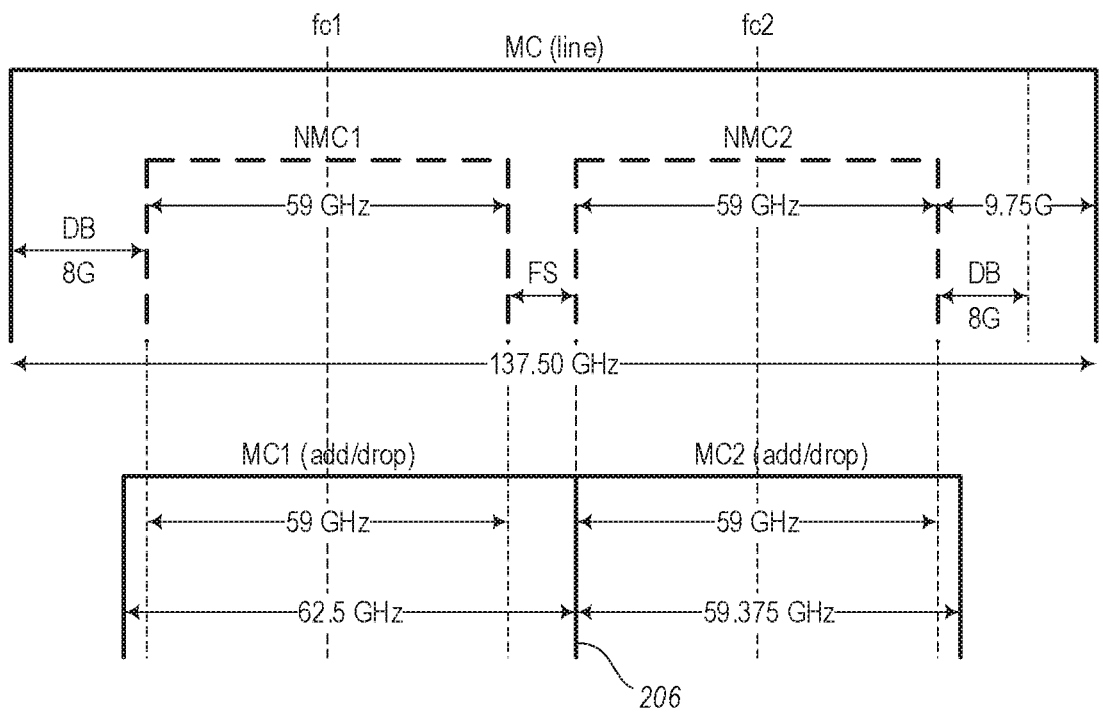

In FIG. 15, a round-down value of the NMC low-frequency edge should be greater than or equal to the round-up value of the preceding NMC high-frequency edge. In FIG. 16, the channel spacing between NMCs may be adjusted by the spectrum management application 78 with a frequency shift (FS) to avoid potential MC overlaps in the add/drop devices that have 0 GHz deadband requirement and operate at 3.125 GHz resolution, which is lower than the line WSS resolution (6.25 GHz). The frequency shift can be defined as follows:

$FS=\text{Max}(\text{RoundUP}_{3.125}(LDBLineMC+NMCBW1)-(LDBLineMC+NMCBW1)-GB,0)$ In FIG. 17, two NMCs are placed in 59 GHz Spacing (with 0 GHz guardband in between the NMC boundaries) in the same line MC, where the line WSS operates with a 6.25 GHz resolution or granularity. Each NMC occupies an MC in the WSS add/drop devices that operates in 3.125 GHz granularity. An 8 GHz deadband is allocated on each edge of the line MC to avoid filter roll-off penalties. No deadband is allocated (0 GHz) for the add/drop structure. Since the Fill Bandwidth (FBW) of 1.75 GHz is greater than the guardband (GB) of 0 GHz, the center frequency fc2 of the second NMC is automatically shifted by the spectrum management application 78 using an embodiment of an algorithm that utilizes the calculated FBW amount.

Therefore, according to some embodiments of the present disclosure, an optical communication protocol for routing an optical signal through an optical network element is described herein. The optical communication protocol may include allocating a first spectrum assignment for routing the optical signal through line devices of the optical network element having at least two degrees. The protocol may further include allocating a second spectrum assignment for routing the optical signal through add/drop devices of the optical network element, the second spectrum assignment being different from the first spectrum assignment.

This optical communication protocol may be further defined whereby the second spectrum assignment differs from the first spectrum assignment with respect to one or more of bandwidths of optical channels of the optical signal, deadbands of the optical signal, and guardbands of the optical signal. The optical communication protocol may further include calculating a minimum frequency allocation resolution of at least one of the bandwidths, deadbands, and guardbands. Also, the optical communication protocol may derive edges of one or more Network Media Channels (NMCs) for routing according to the second spectrum assignment by adding the bandwidths, deadbands, and guardbands of NMCs routing according to the first spectrum assignment and snapping the edges to a minimum actuator resolution of the line devices.

Furthermore, the optical communication protocol described above may further be defined whereby the minimum actuator resolution is based on a least common multiple of the bandwidths, deadbands, and guardbands. The optical communication protocol may include dynamically extending the guardband between two neighboring NMCs if the guardband is shorter than an additional bandwidth required for snapping to the minimum actuator resolution. Dynamically extending the guardband may be configured to avoid MC overlap over the add/drop devices and to avoid filter roll-off penalties.

In addition, the optical communication protocol may further comprise performing a frequency shift to the optical signal from the line devices for routing according to the second spectrum assignment. The optical communication protocol may also include calculating the frequency shift as a delta between a fill bandwidth and an allocated guardband. Each of a plurality of Network Media Channels (NMCs) of a Media Channel (MC) routed through the line devices may be configured to be routed through the add/drop devices on its own MC. The NMCs arriving at the line devices from the add/drop devices may be confined to one MC for transmission to one or more external network elements along a line associated with one degree.

FIGS. 18 and 19 show tables of spectrum assignment information for various assignment protocols for use with the optical network element 80. FIG. 18 shows a table 210 of the spectrum requirements for non-constrained add/drop structure for the add/drop devices 96, 98 shown in FIG. 7. In this table 210, sixteen NMCs are placed with 61.5 GHz channel spacing with a 2.5 GHz guardband in between the NMC boundaries in the same line MC. The line WSS devices 84, 86 operate with a 6.25 GHz resolution or granularity. Each NMC occupies an MC in the WSS add/drop devices that operates with a 3.125 GHz granularity. A deadband of 8 GHz is allocated on each edge of the line MC to avoid filter roll-off penalties. No deadband is allocated (0 GHz) for the add/drop devices. In the non-constrained add/drop structure table 210 of FIG. 16, a maximum of 76 channels having a bandwidth of 59 GHz (e.g., typically a 56 G Baud rate) can be placed in a 4800 GHz C-band.

In FIG. 19, a table 220 shows the spectrum assignment for WSS-based add/drop structure with deadband and resolution constraints. In a non-constrained add/drop structure, according to one embodiment, a maximum of 75 channels having a 59 GHz bandwidth (e.g., typically a 56 G Baud rate) can be placed in the 4800 GHz C-band.

FIGS. 20-21 are tables 230, 240 illustrating spectrum assignment information for various spectrum assignment or fiber management protocols for use with the optical network element 80. Sixteen NMCs are placed with 61.5 GHz channel spacing with a 2.5 GHz guardband in between the NMC boundaries in the same line MC. The WSS line devices operate with a 6.25 GHz granularity. Each NMC occupies an MC in the WSS add/drop devices that operates with a 3.125 GHz granularity. A deadband of 8 GHz is allocated on each edge of the line MC to avoid filter roll-off penalties. No deadband is allocated (0 GHz) for the add/drop devices.

According to the examples described in the present disclosure, the spectrum assignment methods are able to achieve parity in spectral efficiency regardless of the deadband, resolution, or constraints regarding the individual MC per NMC imposed on the add/drop compared with any other non-constrained colorless mux/demux architecture. The embodiments described herein focus on efficient spectrum assignment methods in an all-flexible grid channel path, where the spectrum-selective switching devices in the add/drop portion of the optical network element add explicit additional constraints for co-routing a plurality of network media channels (NMCs) within a media channel (MC). More precisely, the embodiments focus on efficient spectrum assignment methods for co-routing a plurality of NMCs in a MC in a flexible-grid capable route, where the channel add/drop structure includes spectrum-selective switching devices (WSSs) that can operate at a different actuator resolution than the line-facing spectrum-selective switching devices at the Optical Add/Drop Multiplexer (OADM) degrees. Also, the spectrum-selective switching devices (WSSs) can enforce the constraint that the NMCs going to each add/drop switch port is confined to its own media channel (MC), while the plurality of NMCs and their own MCs going from the add/drop devices to the line/degree WSS switch port can be confined to a single MC on the line. Furthermore, the spectrum-selective switching devices (WSSs) are also capable of adding the additional assignment characteristics of applying different deadbands for MCs at the channel add/drop structure to the assignment characteristics of the MC at the line-facing devices to improve spectral efficiency, while maintaining the link budget requirements.

Conventional systems in the field of optical communication systems do not handle spectrum assignment for a plurality of NMCs with the above-mentioned features. The various embodiments of the present disclosure introduce new assignment characteristics on the add/drop structure. One way that this can be done is by finding the minimum frequency allocation necessary per Media Channel (MC) in the line-facing photonic switching devices to accommodate a plurality of NMCs in a spectrally efficient way. The methods of the present disclosure recognize the newly introduced assignment characteristics on the add/drop structure and find the minimum frequency allocation necessary per MC in line-facing photonic switching devices to maintain spectral efficiency. The present embodiments also provide an improvement over conventional systems in that a pre-computed approach (using the various spectrum assignment functionality and waveband calculation algorithms of the spectrum management application 78) that simplifies the overall spectrum assignment process. Also, spectrum assignment can be applied to the various portion of an optical network element while hiding the multi-layer assignment characteristics between the WSS line devices and the WSS add/drop devices.

The algorithms for assigning spectrum can be accomplished for a plurality of NMCs in an efficient way so that the NMCs can be co-routed without interference. The algorithms ensure that the spectrum assignment is available to the WSS-based add/drop devices (e.g., contentionless and colorless-channel devices) at both ingress and egress ports. Also, the algorithms can ensure the add/drop structure follows a different resolution for provisioning and snapping MC edges to a granularity that is not necessarily the same as the line/degree WSS devices.

The spectrum management application 78 may be configured to respond to a request for spectrum assignment for a number (N) of NMCs or super-channels where N>1. In use, it would be recommended to use deadband, signal width, and channel spacing values that are not necessarily multiples of pixel granularity of only the WSS devices in the line/degree or in the add/drop structure.

The systems and methods described in the present disclosure effectively couple the "dynamic" guardbands that come from the deadband and individual MC/NMC spectrum features present on the add/drop structure since that forces to combine multiple MCs from the add/drop devices in a single MC in the line. However, this is done with no constraints between the NMCs that may have been provisioned as "static" guardbands.

In a traditional network, it is not possible to split multiple NMCs from an MC without impacting the other existing traffic. Even if one were to attempt to dynamically split an MC and squeeze an NMC in between, the new NMC size will have to be smaller than the available BW. The embodiments of the present disclosure can dynamically extend guardbands or minimum channel spacing between NMCs in an MC instead of considering a "fixed," "static" wider pre-provisioned spacing (or guardbands).

The method of creating spectrum assignments may be scalable with the pre-combiners described with respect to FIG. 8, as well as cascaded contentionless and colorless mux/demux devices. This can be one embodiment for building the system in a reconfigurable line system switch in order to support variable deadband requirements from the add/drop structures.

The present disclosure may be applied to provide point-point solutions for data center providers and the like. In a contentionless/colorless ROADM, a CDC ROADM may be used in a point-point configuration. The embodiments described herein may be generic to provide efficient spectral allocation for any network configuration (e.g., point-point or full mesh connectivity). The point-point configuration is presented as an example where a check can be made of the maximum capacity that a nodal configuration can offer.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. An optical network element comprising:
   line devices configured to communicate optical signals with external network elements along one or more degrees; and
   add/drop devices configured to perform at least one of adding one or more optical channels to the optical signals and removing one or more optical channels to the optical signals;
   wherein the line devices and add/drop devices are configured to receive control signals from a spectrum management controller;
   wherein the control signals from the spectrum management controller are configured to allocate a first spectrum assignment for routing the optical signals through the line devices and further configured to allocate a second spectrum assignment for routing the optical signals through the add/drop devices; and
   wherein the second spectrum assignment is different from the first spectrum assignment, and wherein the add/drop devices have different actuator resolution and optical filter penalty constraints for allocating a channel than the line devices.

2. The optical network element of claim 1, wherein the line devices and add/drop devices are configured, according to the control signals, to enforce Dense Wavelength Division Multiplexing (DWDM) to provide end-to-end flexible routing of the optical signals through the optical network element.

3. The optical network element of claim 1, wherein the line devices include at least one spectrum-selective switching device and the add/drop devices include at least one spectrum-selective switching device.

4. The optical network element of claim 1, wherein the spectrum management controller is configured to run globally from a higher layer controller or locally in the optical network element.

5. The optical network element of claim 1, wherein the add/drop devices are colorless, directionless, and/or contentionless (CDC) devices.

6. The optical network element of claim 1, wherein the first spectrum assignment allows a plurality of Network Media Channels (NMCs) to be confined in one Media Channel (MC), and wherein the second spectrum assignment configures an NMC to be routed in its own individual MC.

7. The optical network element of claim 6, wherein the add/drop devices include one or more pre-combiners and one or more colorless-channel multiplexer/demultiplexer devices, the one or more pre-combiners configured to accommodate the plurality of NMCs into the same add/drop port of the one or more colorless-channel multiplexer/demultiplexer devices.

8. The optical network element of claim 7, wherein a plurality of MCs and the respective NMCs of the MCs from the one or more colorless-channel multiplexer/demultiplexer devices are accommodated into a single MC in a Wavelength Selective Switch (WSS) of the line devices.

9. A non-transitory computer-readable medium configured to store computer logic having instructions for causing one or more processing devices to perform steps of:
   allocating a first spectrum assignment for routing one or more optical signals through line devices of an optical network element having at least two degrees; and allocating a second spectrum assignment for routing the one or more optical signals through add/drop devices of the optical network element, the second spectrum assignment being different from the first spectrum assignment, wherein the second spectrum assignment differs from the first spectrum assignment with respect to one or more of bandwidths of optical channels to accommodate the one or more optical signals, deadbands to avoid filter roll-off penalties of the one or more optical signals, and guardbands to ensure minimum frequency spacing between neighboring optical signals.

10. The non-transitory computer-readable medium of claim 9, wherein the steps further include calculating a minimum frequency allocation resolution of at least one of the bandwidths, deadbands, and guardbands.

11. The non-transitory computer-readable medium of claim 9, wherein the steps further include deriving edges of one or more Network Media Channels (NMCs) for routing according to the first spectrum assignment considering the MC deadbands and guardbands of NMCs and snapping the MC edges to a minimum actuator resolution of the line devices and according to the second spectrum assignment by adding the bandwidths and deadbands of MCs and snapping the individual MC edges to a minimum actuator resolution of the add/drop devices.

12. The non-transitory computer-readable medium of claim 11, wherein the minimum actuator resolution is based on a least common multiple of the bandwidths, deadbands, and guardbands.

13. The non-transitory computer-readable medium of claim 11, further comprising dynamically extending the guardband between two neighboring NMCs if the guardband is shorter than an additional bandwidth required for snapping to the minimum actuator resolution, wherein dynamically extending the guardband is configured to avoid MC overlap over the add/drop devices and to avoid filter roll-off penalties.

14. The non-transitory computer-readable medium of claim 9, wherein the steps further include
performing a frequency shift to the optical signal from the line devices for routing according to the second spectrum assignment; and
calculating the frequency shift as a delta between a fill bandwidth and an allocated guardband.

15. The non-transitory computer-readable medium of claim 14, wherein each of a plurality of Network Media Channels (NMCs) of a Media Channel (MC) routed through the line devices is configured to be routed through the add/drop devices on its own MC, and wherein the NMCs arriving at the line devices from the add/drop devices are confined to one MC for transmission to one or more external network elements along a line associated with one degree.

16. A non-transitory computer-readable medium configured to store computer logic having instructions for causing one or more processing devices to perform steps of:
allocating a first spectrum assignment for routing one or more optical signals through line devices of an optical network element having at least two degrees;
allocating a second spectrum assignment for routing the one or more optical signals through add/drop devices of the optical network element, the second spectrum assignment being different from the first spectrum assignment;
performing a frequency shift to the optical signal from the line devices for routing according to the second spectrum assignment; and
calculating the frequency shift as a delta between a fill bandwidth and an allocated guardband.

17. The non-transitory computer-readable medium of claim 16, wherein the second spectrum assignment differs from the first spectrum assignment with respect to one or more of bandwidths of optical channels to accommodate the one or more optical signals, deadbands to avoid filter roll-off penalties of the one or more optical signals, and guardbands to ensure minimum frequency spacing between neighboring optical signals.

18. The non-transitory computer-readable medium of claim 16, wherein the steps further include calculating a minimum frequency allocation resolution of at least one of the bandwidths, deadbands, and guardbands.

19. The non-transitory computer-readable medium of claim 16, wherein the steps further include deriving edges of one or more Network Media Channels (NMCs) for routing according to the first spectrum assignment considering the MC deadbands and guardbands of NMCs and snapping the MC edges to a minimum actuator resolution of the line devices and according to the second spectrum assignment by adding the bandwidths and deadbands of MCs and snapping the individual MC edges to a minimum actuator resolution of the add/drop devices.

20. The non-transitory computer-readable medium of claim 19, wherein the minimum actuator resolution is based on a least common multiple of the bandwidths, deadbands, and guardbands.

* * * * *